United States Patent
Kakinoki et al.

(10) Patent No.: US 11,487,385 B1
(45) Date of Patent: Nov. 1, 2022

(54) INPUT DETECTION SYSTEM

(71) Applicant: Japan Display Inc., Tokyo (JP)

(72) Inventors: Yuto Kakinoki, Tokyo (JP); Takaaki Kono, Tokyo (JP); Makoto Hayashi, Tokyo (JP)

(73) Assignee: Japan Display Inc., Toyko (JP)

( * ) Notice: Subject to any disclaimer, the term of this patent is extended or adjusted under 35 U.S.C. 154(b) by 0 days.

(21) Appl. No.: 17/723,712

(22) Filed: Apr. 19, 2022

(30) Foreign Application Priority Data

Apr. 21, 2021 (JP) .............................. JP2021-071916

(51) Int. Cl.
| | | |
|---|---|---|
| *G06F 3/041* | (2006.01) | |
| *G06F 3/044* | (2006.01) | |
| *G06F 3/039* | (2013.01) | |
| *G06F 3/0362* | (2013.01) | |
| *G06F 3/02* | (2006.01) | |

(52) U.S. Cl.
CPC .............. *G06F 3/0418* (2013.01); *G06F 3/02* (2013.01); *G06F 3/0362* (2013.01); *G06F 3/0393* (2019.05); *G06F 3/0446* (2019.05); *G06F 3/04166* (2019.05)

(58) Field of Classification Search
CPC ...... G06F 3/02; G06F 3/03543; G06F 3/0362; G06F 3/0393; G06F 3/04166; G06F 3/0418; G06F 3/0446
See application file for complete search history.

(56) References Cited

U.S. PATENT DOCUMENTS

| | | | | |
|---|---|---|---|---|
| 9,921,644 | B2* | 3/2018 | Daguet | G06F 3/0425 |
| 10,139,854 | B2* | 11/2018 | Krishnakumar | G06F 3/041 |
| 10,139,930 | B2* | 11/2018 | Files | G06F 3/0488 |
| 10,139,973 | B2* | 11/2018 | Files | G06F 3/0441 |
| 10,613,649 | B2* | 4/2020 | Stone | G06F 3/038 |
| 10,635,199 | B2* | 4/2020 | Morrison | G06F 3/0487 |
| 10,664,101 | B2* | 5/2020 | Files | G06F 3/0488 |
| 10,761,618 | B2* | 9/2020 | Yildiz | G06F 3/0354 |
| 10,795,502 | B2* | 10/2020 | Knoppert | G06F 3/016 |
| 10,817,077 | B2* | 10/2020 | Knoppert | G06F 3/0393 |
| 10,852,853 | B2* | 12/2020 | Knoppert | G06F 3/04847 |
| 10,852,859 | B2* | 12/2020 | Tan | H02J 7/1446 |
| 10,860,140 | B2* | 12/2020 | Files | G06F 3/038 |
| 11,010,043 | B2* | 5/2021 | Busby | G06F 3/0393 |
| 11,106,314 | B2* | 8/2021 | Krishnakumar | G06V 40/18 |
| 11,269,470 | B2 | 3/2022 | Mori et al. | |
| 2016/0313789 | A1* | 10/2016 | Krishnakumar | G06F 3/0304 |

(Continued)

FOREIGN PATENT DOCUMENTS

| | | |
|---|---|---|
| JP | 6342105 B1 | 5/2018 |
| JP | 6532631 B1 | 5/2019 |

*Primary Examiner* — Michael Pervan
(74) *Attorney, Agent, or Firm* — K&L Gates LLP

(57) ABSTRACT

An input detection system includes a detection device including a plurality of sensor electrodes arrayed in a detection region, an input support device including an LC circuit, a first electrode coupled to one end side of the LC circuit, and a second electrode coupled to another end side of the LC circuit, and a control circuit including a drive signal supply circuit supplying a drive signal to the sensor electrodes and an adjustment circuit coupled to the sensor electrodes. The adjustment circuit adjusts a circuit constant that is added to a capacitance between the sensor electrode and the first electrode or the second electrode facing the sensor electrode.

11 Claims, 16 Drawing Sheets

(56) References Cited

U.S. PATENT DOCUMENTS

| | | | |
|---|---|---|---|
| 2016/0313797 A1* | 10/2016 | Daguet | G09G 5/006 |
| 2016/0316186 A1* | 10/2016 | Krishnakumar | G06F 1/325 |
| 2018/0129347 A1* | 5/2018 | Files | G06F 3/04162 |
| 2018/0129348 A1* | 5/2018 | Files | G06F 3/0441 |
| 2018/0307332 A1* | 10/2018 | Stone | G06F 3/0393 |
| 2019/0155477 A1* | 5/2019 | Busby | G06F 3/03543 |
| 2020/0004348 A1* | 1/2020 | Knoppert | G06F 3/0393 |
| 2020/0004349 A1* | 1/2020 | Yildiz | G06F 3/0393 |
| 2020/0004355 A1* | 1/2020 | Knoppert | G06F 3/038 |
| 2020/0004356 A1* | 1/2020 | Morrison | G06F 3/03549 |
| 2020/0004376 A1* | 1/2020 | Knoppert | G06F 3/0418 |
| 2020/0004377 A1* | 1/2020 | Files | G06F 3/016 |
| 2020/0026367 A1* | 1/2020 | Tan | G06F 3/03543 |
| 2020/0201477 A1* | 6/2020 | Files | G06F 3/0362 |
| 2021/0232269 A1 | 7/2021 | Sasaki et al. | |
| 2021/0240305 A1* | 8/2021 | Takada | G06F 3/0383 |
| 2021/0240307 A1* | 8/2021 | Tanaka | G06F 3/0446 |
| 2021/0286470 A1* | 9/2021 | Takada | G06F 3/0362 |
| 2022/0004303 A1* | 1/2022 | Kakinoki | G06F 3/02 |
| 2022/0066597 A1* | 3/2022 | Kakinoki | G06F 3/02 |
| 2022/0113812 A1* | 4/2022 | Kakinoki | G06F 3/0443 |
| 2022/0137722 A1* | 5/2022 | Hayashi | G06F 3/0362 345/174 |
| 2022/0147189 A1* | 5/2022 | Kakinoki | G06F 3/04162 |

* cited by examiner

INPUT DETECTION SYSTEM

CROSS-REFERENCE TO RELATED APPLICATION

This application claims the benefit of priority from Japanese Patent Application No. 2021-071916 filed on Apr. 21, 2021, the entire contents of which are incorporated herein by reference.

BACKGROUND

1. Technical Field

The present disclosure relates to an input detection system.

2. Description of the Related Art

Japanese Patent Nos. 6342105 and 6532631 describe an input support device (referred to as an operation knob or a knob in Japanese Patent Nos. 6342105 and 6532631) that is placed on a touch panel configured to detect change in electrostatic capacitance or change in a contact region and supports input operations through the touch panel. As a method for detecting the input support device, a method with which the input support device is detected using resonance of a resonance circuit provided in the input support device has been known. In an input detection system using such an input support device, drive electrodes of the touch panel are driven at a drive frequency in accordance with a resonant frequency of the input support device.

If a frequency of external noise is close to the drive frequency of the touch panel and the resonant frequency of the input support device, false detection may occur. Although the drive frequency of the touch panel can be adjusted by a circuit in the touch panel, a circuit constant of the input support device cannot be adjusted in some cases because the input support device includes no internal power supply. That is to say, adjustment of the drive frequency of the touch panel may cause the drive frequency of the touch panel to deviate from the resonant frequency of the input support device.

An object of the present disclosure is to provide an input detection system capable of preventing false detection when external noise invades.

SUMMARY

An input detection system according to an embodiment of the present disclosure includes a detection device including a plurality of sensor electrodes arrayed in a detection region, an input support device including an LC circuit, a first electrode coupled to one end side of the LC circuit, and a second electrode coupled to another end side of the LC circuit, and a control circuit including a drive signal supply circuit supplying a drive signal to the sensor electrodes and an adjustment circuit coupled to the sensor electrodes. The adjustment circuit adjusts a circuit constant that is added to a capacitance between the sensor electrode and the first electrode or the second electrode facing the sensor electrode.

DETAILED DESCRIPTION

Figure 1:
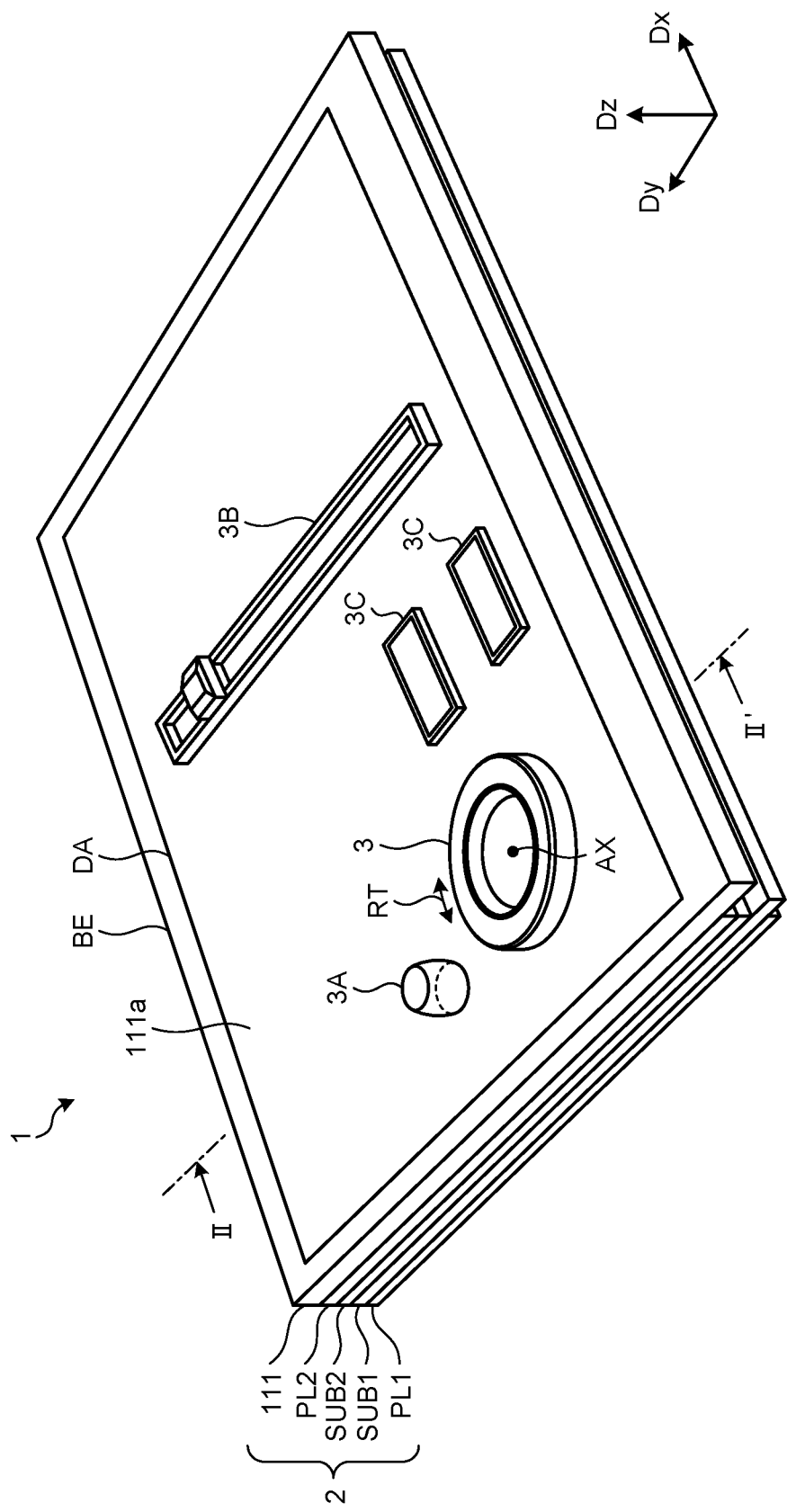
FIG. 1 is a perspective view schematically illustrating an input detection system according to a first embodiment.

Aspects for carrying out the present disclosure (embodiments) will be described in detail with reference to the drawings. Contents described in the following embodiments do not limit the present disclosure. Components described below include those that can be easily assumed by those skilled in the art and substantially the same components. Furthermore, the components described below can be appropriately combined. What is disclosed herein is merely an example, and appropriate modifications within the gist of the disclosure of which those skilled in the art can easily think are naturally encompassed in the scope of the present disclosure. In the drawings, widths, thicknesses, shapes, and the like of the components can be schematically illustrated in comparison with actual aspects for more clear explanation. They are however merely examples and do not limit interpretation of the present disclosure. In the present disclosure and the drawings, the same reference numerals denote components similar to those described before with reference to the drawing that has been already referred, and detail explanation thereof can be appropriately omitted.

In the present specification and the scope of the disclosure, when representing an aspect in which one structure is arranged above another structure, simple expression "above" includes both of the case in which the one structure is arranged directly on the other structure so as to be in contact with the other structure and the case in which the one structure is arranged above the other structure with yet another structure interposed therebetween unless otherwise specified.

First Embodiment

Figure 2:
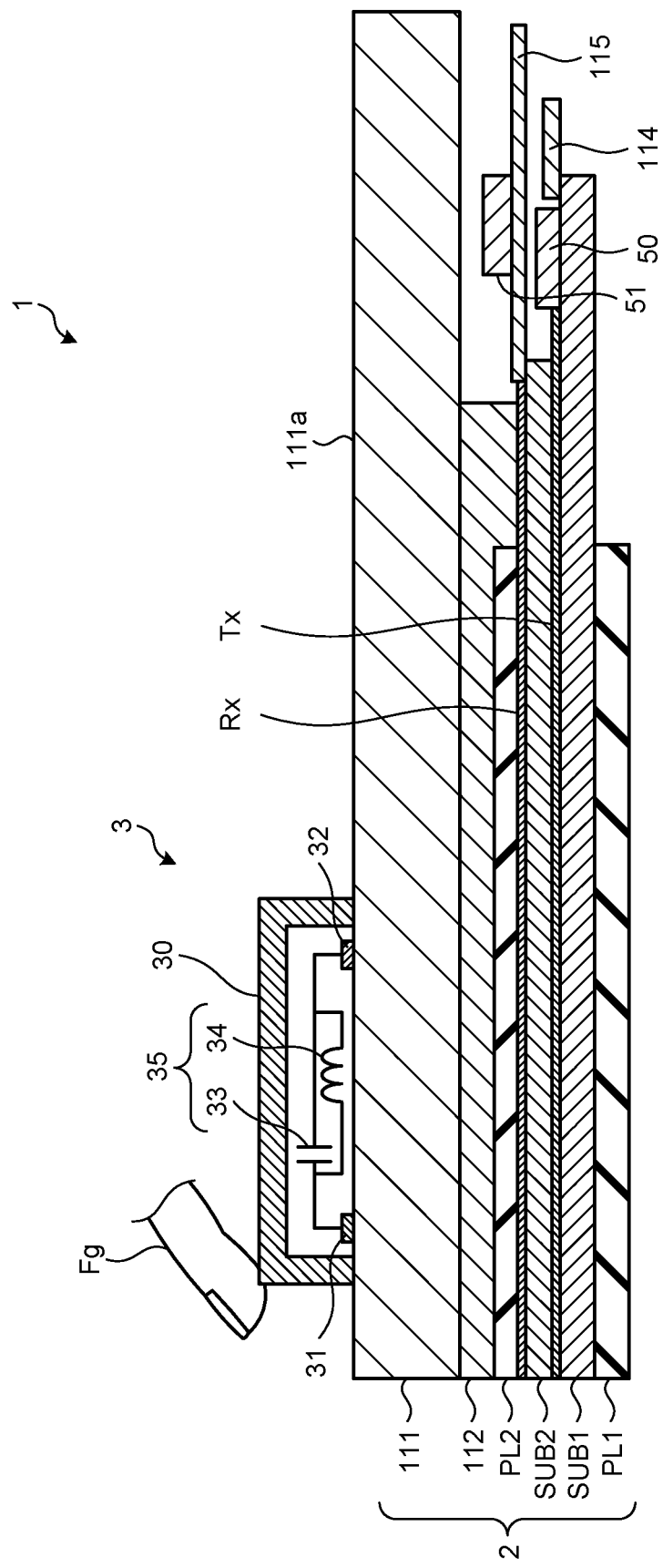
FIG. 2 is a cross-sectional view cut along line II-II' in FIG. 1.

FIG. 1 is a perspective view schematically illustrating an input detection system according to a first embodiment. FIG. 2 is a cross-sectional view cut along line II-II' in FIG. 1. As illustrated in FIG. 1 and FIG. 2, an input detection system 1 includes a display device 2 and an input support device 3.

One direction of a plane (upper surface 111a) of the display device 2 is a first direction Dx, and a direction orthogonal to the first direction Dx is a second direction Dy. The second direction Dy is not limited to be orthogonal to the first direction Dx and may intersect with the first direction Dx at an angle other than 90°. A third direction Dz orthogonal to the first direction Dx and the second direction Dy corresponds to the thickness direction of an array substrate SUB1.

The display device 2 is, for example, a liquid crystal display (LCD). The display device 2 is however not limited thereto and may be, for example, an organic electro-luminescence (EL) display panel (organic light emitting diode (OLED)) or an inorganic EL display (micro LED, mini LED). Alternatively, the display device 2 may be an electrophoretic display (EPD) that uses electrophoretic elements as display elements.

The display device 2 is a display device with a detection function that includes drive electrodes Tx and detection electrodes Rx (refer to FIG. 3) and has functions as a mutual electrostatic capacitance-type touch panel (detection device). In the present embodiment, some of the electrodes and wiring of the display device 2 are shared by electrodes (drive electrodes Tx) and wiring of the touch panel (detection device).

As illustrated in FIG. 1, the display device 2 includes the array substrate SUB1, a counter substrate SUB2, a first polarizing plate PL1, a second polarizing plate PL2, a cover member 111, and an adhesive layer 112 (refer to FIG. 2). The first polarizing plate PL1, the array substrate SUB1, the counter substrate SUB2, the second polarizing plate PL2, the adhesive layer 112, and the cover member 111 are stacked in this order in the third direction Dz.

The array substrate SUB1 is a drive circuit substrate for driving a plurality of pixels PX. The array substrate SUB1 includes a first substrate 10 as a base body. The drive electrodes Tx are provided above the array substrate SUB1. The array substrate SUB1 includes transistors and various wiring lines such as scan lines GL and pixel signal lines SL (refer to FIG. 3) provided on the first substrate 10. The counter substrate SUB2 is provided so as to face the array substrate SUB1. A liquid crystal layer as a display function layer is provided between the array substrate SUB1 and the counter substrate SUB2. The detection electrodes Rx are provided above the counter substrate SUB2.

As illustrated in FIG. 1, a peripheral region BE is provided on the outer side of a display region DA in the display device 2. The display region DA is formed to have a square shape but the outer shape of the display region DA is not limited thereto. For example, the display region DA may have a substantially square shape with curved corners or may have a cutout. Alternatively, the display region DA may have another polygonal shape or another shape such as a circular shape and an elliptic shape.

The display region DA is a region for displaying an image and is a region in which the pixels PX (refer to FIG. 3) are provided. The peripheral region BE indicates a region on the inner side of the outer circumference of the array substrate SUB1 and on the outer side of the display region DA. The peripheral region BE may have a frame shape surrounding the display region DA, and in this case, the peripheral region BE can also be referred to as a frame region.

As illustrated in FIG. 2, a display integrated circuit (IC) 50 and a wiring substrate 114 are coupled to the protruding portion of the array substrate SUB1. The display IC 50 includes a control circuit that controls display of the display device 2 and touch detection. The display IC 50 is not limited to this example and may be mounted on the wiring substrate 114. Arrangement of the display IC 50 is not limited thereto, and the display IC 50 may be provided on a control substrate or a flexible substrate outside the module, for example.

A wiring substrate 115 is coupled to the counter substrate SUB2. A detection IC 51 is mounted on the wiring substrate 115. The detection IC 51 includes a detection circuit 76 (refer to FIG. 6) and receives supply of detection signals Vdet from the detection electrodes Rx. The detection IC 51 can detect a detection target such as the input support device 3 and a finger Fg based on the detection signals Vdet. Arrangement of the detection IC 51 is not limited thereto, and the detection IC 51 may be provided on a control substrate or a flexible substrate outside the module, for example.

Each of the wiring substrate 114 and the wiring substrate 115 is configured by, for example, flexible printed circuits (FPC).

In the present specification, when the display IC 50 and the detection IC 51 need not to be distinguished from each other for explanation, they can be referred to as a control circuit simply. Some of the circuits and functions included in the display IC 50 may be provided in the detection IC 51, and some of the circuits and functions included in the detection IC 51 may be provided in the display IC 50. The control circuit may include circuit elements and wiring formed separately from the display IC 50 and the detection IC 51, for example, circuit elements and wiring formed on the array substrate SUB1.

As illustrated in FIG. 1 and FIG. 2, the input support device 3 is arranged (mounted) on the upper surface 111a of the cover member 111 for use. A user can perform an input operation on the display device 2 by operating the input support device 3 arranged above the display device 2. The input support device 3 is, for example, a rotary knob and has a circular shape in a plan view when seen from the upper surface 111a of the display device 2. The display device 2 can detect a position of the input support device 3 in a plane and a rotation operation RT centered on a rotating axis AX. That is to say, in the present embodiment, the display region DA is a region in which a plurality of drive electrodes Tx and the detection electrodes Rx (refer to FIG. 3) are provided and serves also as a detection region.

As illustrated in FIG. 2, the input support device 3 includes a housing 30, a first electrode 31, a second electrode 32, and an LC circuit 35. The housing 30 is formed by, for example, a conductor made of a metal material and is a hollow member having a space therein. The housing 30 is not limited to be made of the metal material and may be made of a resin material, or may be configured with a resin material covering the surface of the metal material.

The first electrode 31, the second electrode 32, and the LC circuit 35 are provided in the housing 30. The LC circuit 35 configures an LC resonance circuit in which a capacitor 33 and an inductor 34 are coupled in parallel with each other. The first electrode 31 is coupled to one end side of the LC circuit 35 (coupling portion N1 (refer to FIG. 4) of the capacitor 33 and the inductor 34 on one end side). The second electrode 32 is coupled to the other end side of the LC circuit 35 (coupling portion N2 (refer to FIG. 4) of the capacitor 33 and the inductor 34 on the other end side). The display device 2 can detect positions of the first electrode 31 and the second electrode 32 using LC resonance of the LC circuit 35.

FIG. 1 illustrates a plurality of input support devices 3A, 3B, and 3C as other examples of the input support device 3. The input support device 3A is a rotary knob and is formed into a tab shape having a planar shape (radius) smaller than that of the input support device 3. The input support device 3B is a slider, and an input operation can be performed by displacement of a tab thereof in a plane. The input support device 3B has a bar-like shape in a plan view. The input support device 3C is a button or an input key, and an input operation can be performed by touching the input support device 3C or performing a press-in operation thereon. The input detection system 1 is not limited to have the configuration in which all of the input support devices 3, 3A, 3B, and 3C are mounted, and it is sufficient that at least one or more of the input support devices 3, 3A, 3B, and 3C is provided. Hereinafter, the input support device 3 is described. Explanation of the input support device 3 can also be applied to the other input support devices 3A, 3B, and 3C.

Figure 3:
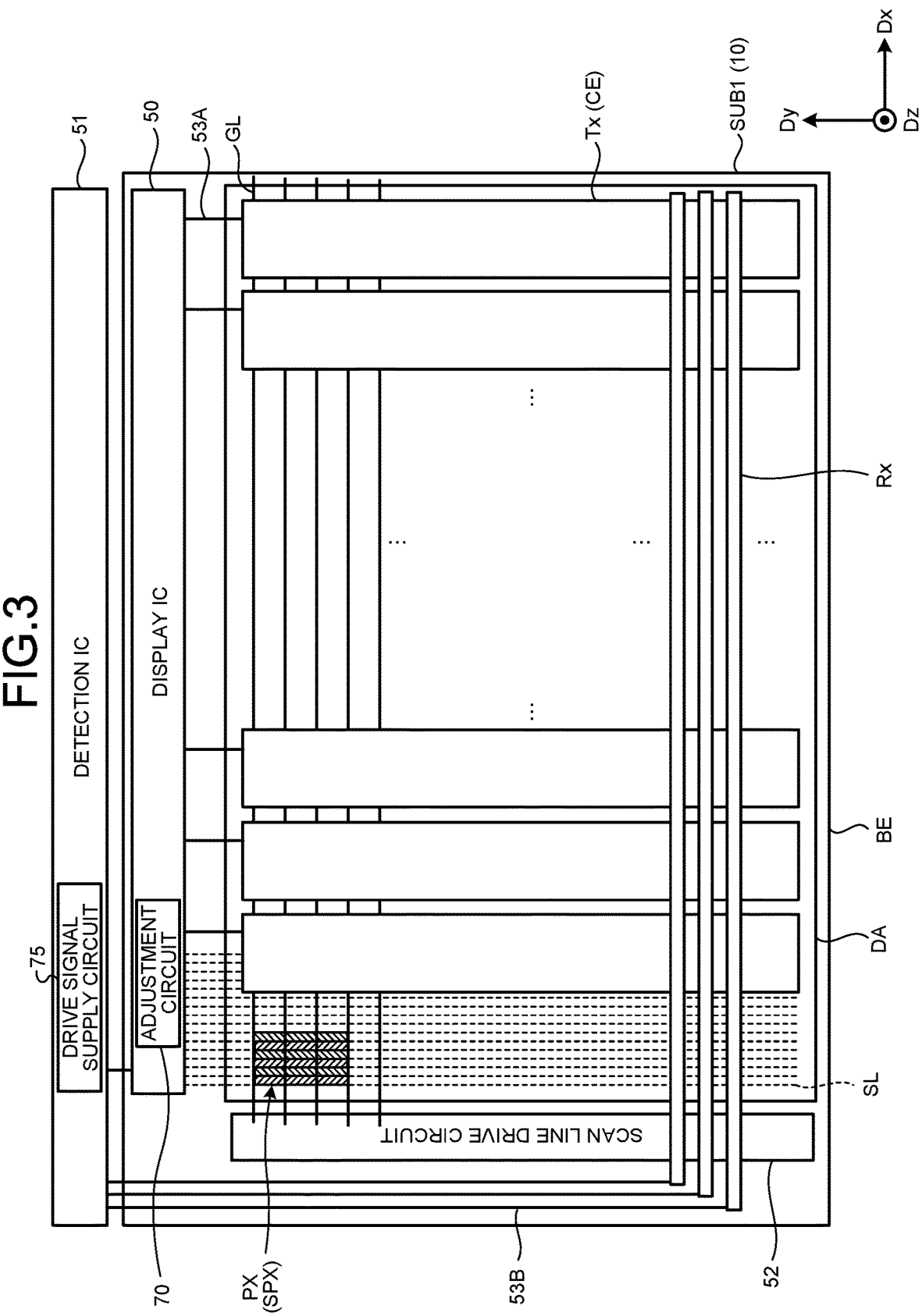
FIG. 3 is a plan view schematically illustrating an array substrate included in a display device.

FIG. 3 is a plan view schematically illustrating the array substrate included in the display device. FIG. 3 schematically illustrates a part of the detection electrodes Rx provided on the counter substrate SUB2 in order to explain the relation between the drive electrodes Tx and the detection electrodes Rx. As illustrated in FIG. 3, the pixels PX (sub pixels SPX) are arrayed in a matrix with a row-column configuration in the display region DA. The pixel signal lines SL and the scan lines GL are provided so as to correspond to the sub pixels SPX. The pixel signal lines SL are coupled to the control circuit such as the display IC 50 provided in the peripheral region BE. A scan line drive circuit 52 is provided in a region extending along the second direction Dy in the peripheral region BE. The scan lines GL are coupled to the scan line drive circuit 52. The scan line drive circuit 52 is a circuit configured to supply a scan signal for driving the pixels PX (sub pixels SPX) to the scan lines GL.

Each of the drive electrodes Tx (sensor electrodes) extends in the second direction Dy and is aligned in the first direction Dx. The drive electrodes Tx are coupled to the display IC 50 through respective coupling wiring lines 53A. Each of the detection electrodes Rx extends in the first direction Dx and is aligned in the second direction Dy. The detection electrodes Rx are coupled to the detection IC 51 through coupling wiring lines 53B. The drive electrodes Tx and the detection electrodes Rx are provided so as to intersect with each other in a plan view. An electrostatic capacitance is formed in each of intersecting portions of the drive electrodes Tx and the detection electrodes Rx. The detection IC 51 can detect the detection target based on the detection signals Vdet that are output in accordance with change in the mutual electrostatic capacitances between the drive electrodes Tx and the detection electrodes Rx. The drive electrodes Tx and the detection electrodes Rx may be collectively referred to as sensor electrodes.

Although FIG. 3 illustrates only some drive electrodes Tx, some detection electrodes Rx, and some pixels PX (sub pixels SPX) for easier viewing, the drive electrodes Tx, the detection electrodes Rx, and the pixels PX are arranged on the entire display region DA. That is to say, the pixels PX are arranged so as to overlap with one drive electrode Tx. One drive electrode Tx is arranged so as to overlap with the pixel signal lines SL.

The drive electrodes Tx serve as common electrodes for forming an electric field between the drive electrodes Tx and the pixel electrodes (not illustrated) in display and as the drive electrodes Tx for detecting the detection target such as the input support device 3 and the finger Fg in touch detection. To be specific, the display IC 50 supplies a display drive signal VCOM to the drive electrodes Tx in display. A drive signal supply circuit 75 included in the detection IC 51 supplies a detection drive signal VD to the drive electrodes Tx in order. Details of driving of the drive electrodes Tx will be described later.

Figure 4:
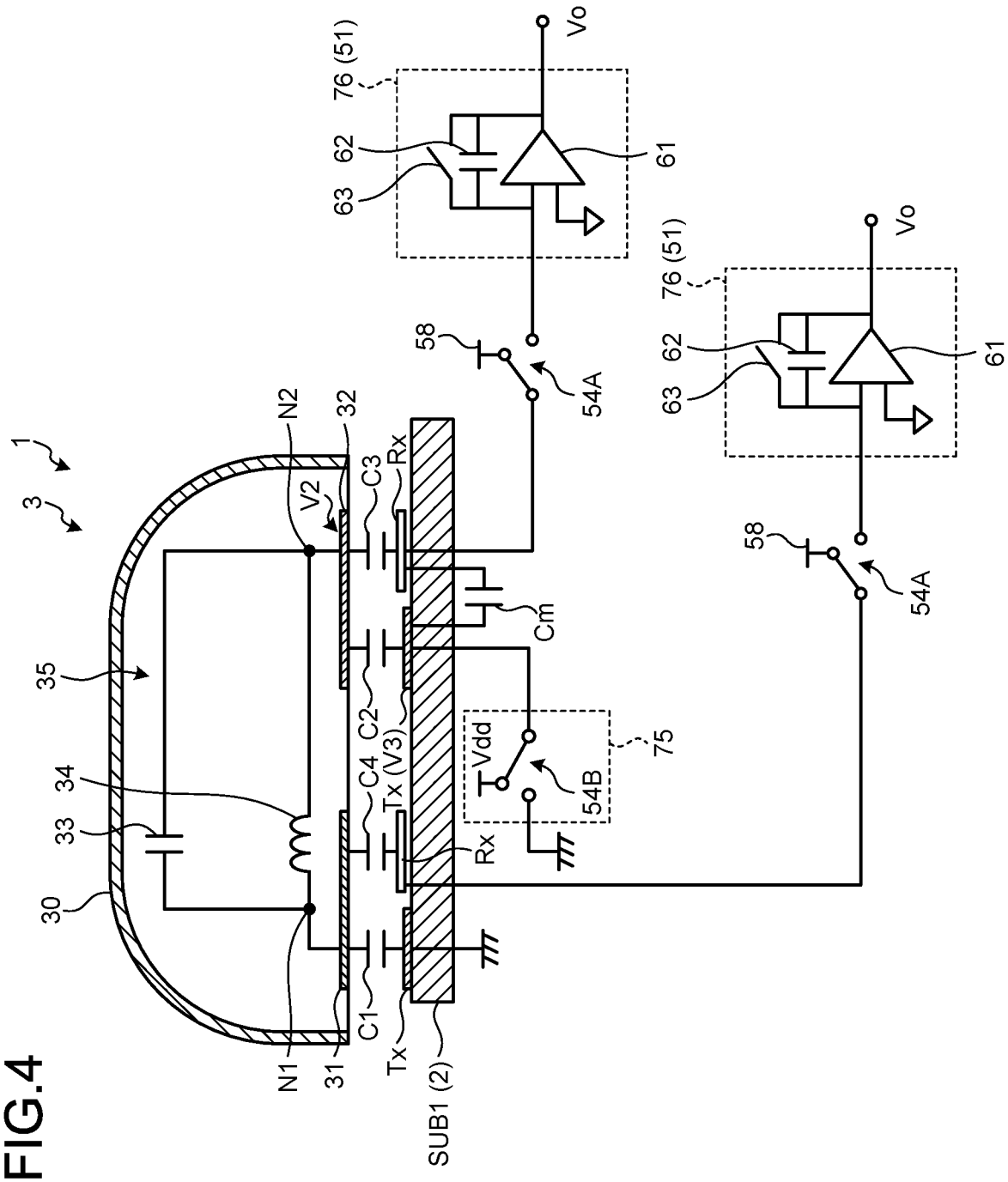
FIG. 4 is a descriptive view for explaining a method for detecting an input support device.

Next, a method for detecting the input support device 3 will be described with reference to FIG. 4 and FIG. 5. FIG. 4 is a descriptive view for explaining a method for detecting the input support device. As illustrated in FIG. 4, each of the first electrode 31 and the second electrode 32 of the input support device 3 faces the drive electrode Tx on the array substrate SUB1 and the detection electrode Rx on the counter substrate SUB2 at certain timing in a detection period (refer to FIG. 9).

The input support device 3 is arranged so as to overlap with the drive electrodes Tx and the detection electrodes Rx. A capacitance C1 is formed between the first electrode 31 and one drive electrode Tx (the drive electrode Tx on the left side in FIG. 4). The one drive electrode Tx is coupled to a reference potential (for example, a reference potential Vdc). A capacitance C2 is formed between the second electrode 32 and the other drive electrode Tx (the drive electrode Tx on the right side in FIG. 4). The other drive electrode Tx is coupled to a power supply potential Vdd or the reference potential (for example, the reference potential Vdc) through a switch element 54B.

A capacitance C3 is formed between the second electrode 32 and the detection electrode Rx facing the second electrode 32. Each of the detection electrodes Rx (the detection electrode Rx on the right side in FIG. 4 and the detection electrode Rx on the left side in FIG. 4) is coupled to the detection circuit 76 or another node 58 through each switch element 54A. The node 58 is coupled to, for example, a reference potential GND (for example, a ground potential).

The node 58 may be coupled to wiring that is coupled to a non-inverting input portion of a detection signal amplifier 61, which will be described later, instead of the reference potential GND. Thus, when the detection electrode Rx is coupled to the node 58, an output-side potential of the detection electrode Rx becomes the same as a potential of the non-inverting input portion of the detection signal amplifier 61. A configuration in which the node 58 is coupled to a floating electrode or a high-impedance (Hi-z) circuit or the switch element 54A is not coupled to the node 58 to bring the detection electrode Rx into a floating state in periods other than a period where it is coupled to the detection circuit 76 can be also employed.

The switch elements 54A that are respectively coupled to the detection electrodes Rx are controlled to be switched into ON or OFF states synchronously. A mutual electrostatic capacitance Cm is formed between the drive electrode Tx and the detection electrode Rx. A capacitance C4 is formed between the first electrode 31 and the detection electrode Rx facing the first electrode 31.

The detection circuit 76 is a signal processing circuit provided in the detection IC 51 and is a circuit that receives the detection signals Vdet (refer to FIG. 5) output from the detection electrodes Rx and performs predetermined signal processing thereon to output an output signal Vo. The detection circuit 76 includes the detection signal amplifier 61, a capacitive element 62, and a reset switch 63. The detection circuit 76 is not limited thereto and may further include an A/D conversion circuit (not illustrated) that converts an analog signal output from the detection signal amplifier 61 into a digital signal.

Figure 5:
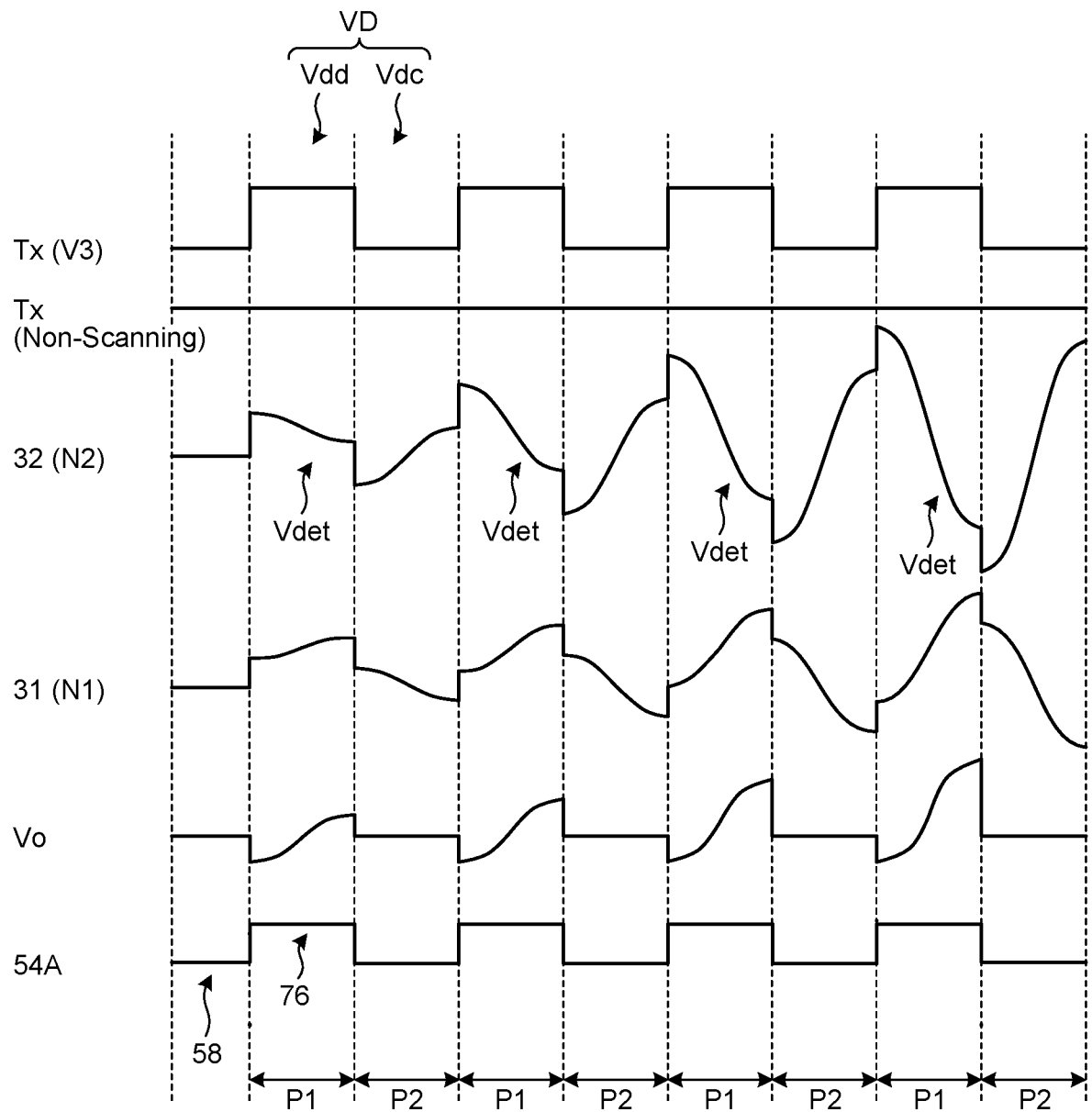
FIG. 5 is a timing waveform chart for explaining the method for detecting the input support device.

FIG. 5 is a timing waveform chart for explaining the method for detecting the input support device. As illustrated in FIG. 4 and FIG. 5, the detection drive signal VD of alternate rectangular waves is supplied to the other drive electrode Tx (the drive electrode Tx on the right side in FIG. 4) by an operation of the switch element 54B. To be more specific, the power supply potential Vdd at a high level potential and the reference potential Vdc at a low level potential are alternately applied repeatedly at a predetermined frequency with a switching operation of the switch element 54B, so that the detection drive signal VD is formed and is supplied to the other drive electrode Tx. A potential V3 of the other drive electrode Tx varies in accordance with the detection drive signal VD.

Periods that are repeated in synchronization with the detection drive signal VD are a first period P1 and a second period P2. The first period P1 is a period in which the other drive electrode Tx is coupled to the power supply potential Vdd (a period in which the switch element 54B couples the other drive electrode Tx and the power supply potential Vdd). The second period P2 is a period in which the other drive electrode Tx is coupled to the reference potential Vdc (a period in which the switch element 54B couples the other drive electrode Tx and the reference potential (ground potential)). The power supply potential Vdd is higher than the reference potential Vdc, for example. Although the detection drive signal VD is formed by a combination of one-time input of the power supply potential Vdd and one-time input of the reference potential Vdc in FIG. 5, it is needless to say that the configuration in which they are repeated a plurality of number of times can also be regarded as the detection drive signal VD.

The detection electrode Rx outputs the detection signals Vdet based on the mutual electrostatic capacitance Cm. To be specific, one drive electrode Tx (the drive electrode Tx on the left side in FIG. 4) is coupled to the reference potential (for example, the reference potential Vdc) in both of the first period P1 and the second period P2, as described above. Signals at different potentials are thereby supplied to the first electrode 31 and the second electrode 32 in the first period P1. The detection electrode Rx is coupled to the detection circuit 76 with the switching operation of the switch element 54A in the first period P1. With this configuration, variation in a potential based on the mutual electrostatic capacitance Cm is output, as the detection signals Vdet, to the detection circuit 76 from the detection electrode Rx. Coupling between the detection electrode Rx and the detection circuit 76 is interrupted with the switching operation of the switch element 54A in the second period P2. The detection electrode Rx is coupled to the node 58 with the switching operation of the switch element 54A in the second period P2.

The detection signal amplifier 61 of the detection circuit 76 amplifies the detection signals Vdet supplied from the detection electrode Rx. A reference voltage having a predetermined potential is input to the non-inverting input portion of the detection signal amplifier 61, and the detection electrode Rx is coupled to an inverting input portion. The same signal as that to one drive electrode Tx is input as the reference voltage that is input to the non-inverting input portion in the present embodiment. A predetermined fixed potential, such as a ground potential, may be set as the reference potential. The detection circuit 76 can reset charges of the capacitive element 62 by turning the reset switch 63 ON.

The detection drive signal VD has the same frequency as the resonant frequency of the LC circuit 35. In the present embodiment, for example, the switching operation of the switch element 54B is performed based on the resonant frequency to form the detection drive signal VD having the resonant frequency. The second electrode 32 overlapping with the other drive electrode Tx is also driven at the resonant frequency, so that resonance of the LC circuit 35 is generated. With this configuration, the amplitudes of the detection signals Vdet are thereby increased as the first period P1 and the second period P2 are repeated in the detection period. As illustrated in FIG. 5, the amplitudes of the detection signals Vdet are increased and the potential of the output signal Vo from the detection circuit 76 varies to be increased as the first period P1 is repeated a plurality of number of times.

With the resonance of the LC circuit 35, the waveform that is generated in the first electrode 31 varies from the waveform that is generated in the second electrode 32 such that the polarities of the first electrode 31 and the second electrode 32 are changed so as to invert from each other. To be specific, the potential of the first electrode 31 varies to be increased and the second electrode 32 varies to be decreased in each first period P1. The potential of the first electrode 31 varies to be decreased and the potential of the second electrode 32 varies to be increased in each second period P2.

Accordingly, the detection signals Vdet that are output from the detection electrode Rx overlapping with the first electrode 31 and the output signal Vo (not illustrated), and the detection signals Vdet that are output from the detection electrode Rx overlapping with the second electrode 32 and the output signal Vo have different polarities. The input detection system 1 may detect various pieces of information of the input support device 3 based on the signal values of the detection signals Vdet having different polarities.

On the other hand, when the detection target such as the finger Fg different from the input support device 3 comes into contact with or close to the upper surface 111a (refer to FIG. 1), the detection signals Vdet vary in accordance with the change in the mutual electrostatic capacitance Cm. That is to say, since no resonance is generated with the detection of the finger Fg or the like, change in the amplitudes of the detection signals Vdet over time as illustrated in FIG. 5 does not occur. The signal values of the detection signals Vdet having the same polarity are detected with the detection of the finger Fg or the like. The input detection system 1 can thus determine whether the detection target is the finger Fg or the input support device 3 using the LC resonance of the LC circuit 35.

Figure 6:
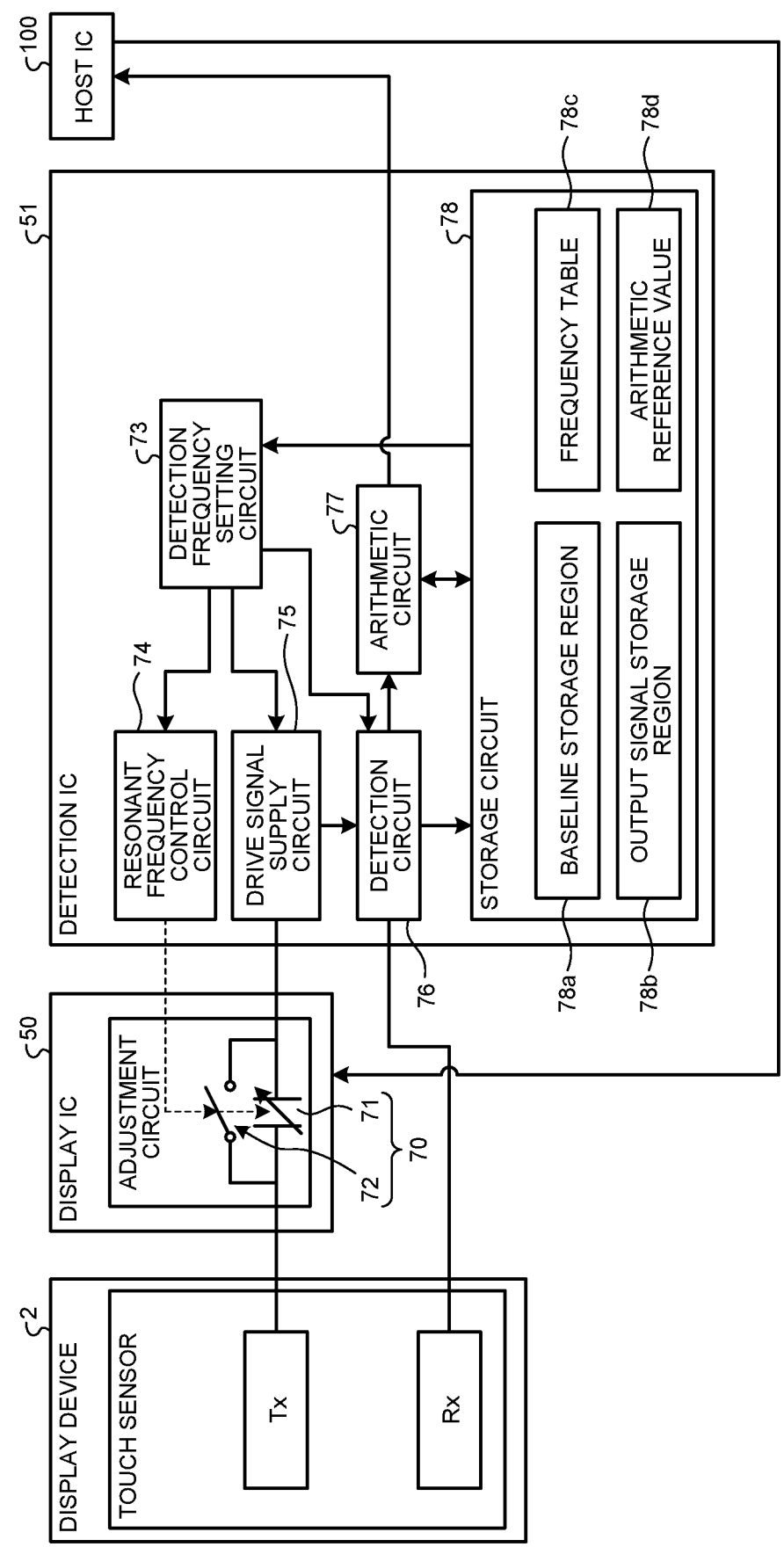
FIG. 6 is a block diagram schematically illustrating an example of the configuration of the input detection system.

Next, a method for adjusting a circuit constant by an adjustment circuit 70 and a method for driving the drive electrodes Tx will be explained. FIG. 6 is a block diagram schematically illustrating an example of the configuration of the input detection system. FIG. 6 illustrates the components related to detection of the detection target such as the input support device 3 and the finger Fg by the display device 2 (touch sensor) and omits components related to the display operation of the display IC 50.

As illustrated in FIG. 6, the display IC 50 (control circuit) includes the adjustment circuit 70 that is coupled to the drive electrode Tx (sensor electrode). The adjustment circuit 70 is a circuit configured to adjust the circuit constant (for example, a capacitance value Cv) that is added to the capacitance C1 or C2 (refer to FIG. 8) between the drive electrode Tx and the first electrode 31 or the second electrode 32 facing the drive electrode Tx.

Specifically, the adjustment circuit 70 includes at least one or more capacitive element 71 and a switch element 72 coupled in parallel with the capacitive element 71. The capacitive element 71 is a variable capacitive element, and the capacitance value Cv can be adjusted based on a control signal from a resonant frequency control circuit 74. The variable capacitive element may have any configuration. For example, the capacitance value Cv can be adjusted in a multistage manner by coupling multiple capacitive elements in parallel (or series) and controlling ON and OFF of the switch elements that change coupling states of these capacitive elements.

ON (coupled state) and OFF (non-coupled state) of the switch element 72 are controlled based on the control signal from the resonant frequency control circuit 74. When the switch element 72 is turned on, one end side and the other end side of the capacitive element 71 are short-circuited, and the capacitance value Cv of the capacitive element 71 is not applied to the drive electrode Tx. In other words, the drive electrode Tx is coupled to the detection IC51 side without the capacitive element 71 interposed therebetween. When the switch element 72 is turned off (non-coupled state), the capacitance value Cv of the capacitive element 71 is applied to the drive electrode Tx. The detailed coupling configuration of the adjustment circuit 70 will be described later with reference to FIG. 7 and FIG. 8.

The detection IC 51 includes a detection frequency setting circuit 73, the resonant frequency control circuit 74, the drive signal supply circuit 75, the detection circuit 76, an arithmetic circuit 77, and a storage circuit 78. The detection circuit 76 performs the signal processing on the detection signals Vdet output from the detection electrodes Rx as described above. The arithmetic circuit 77 performs arithmetic processing based on the output signal Vo from the detection circuit 76. The arithmetic circuit 77 calculates the presence or absence of the detection target, the type of the detection target such as the input support device 3 and the finger Fg, and information about an input operation by the finger Fg or the input support device 3 (for example, position coordinates of the finger Fg, position coordinates and a rotation operation RT of the input support device 3, or the like).

The arithmetic circuit 77 transmits the information about the input operation by the finger Fg or the input support device 3 to a host IC 100. The host IC 100 outputs a control signal to the display IC 50 to perform display in accordance with the input operation.

The touch sensors (detection electrodes Rx) also detect signals of external noise. The detection circuit 76 performs noise signal processing as well as the signal processing on the detection signals Vdet. The arithmetic circuit 77 receives the output signal Vo of the noise and calculates information such as a signal intensity (voltage) and a frequency of the noise. The detection circuit 76 detects information of a baseline in a state where the finger Fg and the input support device 3 are not arranged.

The storage circuit 78 is a circuit configured to store therein various data that is used for calculation of the detection signals Vdet of the finger Fg or the input support device 3 and for calculation of noise detection. The storage circuit 78 includes, for example, a baseline storage region 78a, an output signal storage region 78b, a frequency table 78c, and a calculation reference value 78d.

The baseline storage region 78a stores therein the information of the baseline of the display device 2. The baseline is information for one frame of the output signal Vo when the drive electrodes Tx are scanned in the state where, for example, the detection target such as the input support device 3 and the finger Fg is absent on the display region DA. The detection IC 51 may acquire the baseline periodically with predetermined intervals when or after the display device 2 is powered on.

The output signal storage region 78b stores therein the output signal Vo output from the detection circuit 76. The output signal storage region 78b stores therein, for example, information formed by the output signal Vo for one frame as frame data.

The frequency table 78c stores therein information about a detection frequency at which the drive electrodes Tx are driven and information about the resonant frequency of the input support device 3. The detection frequency is a frequency that the detection drive signal VD to be supplied to the drive electrodes Tx has. The frequency table 78c includes, for example, values such as X (kHz), X+Δx (kHz), X+2Δx (kHz), and X+3Δx (kHz) as the detection frequency.

The arithmetic reference value 78d stores therein various thresholds (reference values) that are used for detection of the detection target such as the input support device 3 and the finger Fg and for calculation of the noise detection. The arithmetic circuit 77 calculates difference data between the frame data stored in the output signal storage region 78b and the baseline stored in the baseline storage region 78a upon detection of the detection target such as the input support device 3 and the finger Fg. The arithmetic circuit 77 then compares the difference data with the thresholds stored in the arithmetic reference value 78d to calculate various pieces of information such as the presence or absence of the detection target such as the input support device 3 and the finger Fg and its position.

The arithmetic circuit 77 compares the signal intensity of the noise and a noise threshold stored in the arithmetic reference value 78d upon detection of external noise to calculate the presence or absence of noise and the frequency of the noise.

The detection frequency setting circuit 73 is a circuit configured to set the detection frequency based on the information about the frequency of the noise that has been calculated by the arithmetic circuit 77 and the information about the detection frequency in the frequency table 78c. For example, when the current detection frequency (for example, X (kHz)) is identical to or close to the frequency of the noise (for example, X (kHz)), the detection frequency setting circuit 73 changes the detection frequency to X+Δx (kHz) so as to avoid the frequency of the noise (for example, X (kHz)).

The detection frequency setting circuit 73 outputs information of the changed detection frequency (for example, X+Δx (kHz)) to the resonant frequency control circuit 74 and the drive signal supply circuit 75. The drive signal supply circuit 75 changes the frequency of the detection drive signal VD to X+Δx (kHz) and supplies the detection drive signal VD having the changed frequency to the drive electrode Tx. The display device 2 (touch sensor) can thereby detect the detection target such as the finger Fg at the detection frequency (for example, X+Δx (kHz)) different from the frequency of the noise (for example, X (kHz)), thus preventing false detection due to the external noise.

On the other hand, the resonant frequency of the LC circuit 35 of the input support device 3 is a fixed value. The LC resonance of the LC circuit 35 does not occur when the frequency of the detection drive signal VD is changed, which may make it difficult to detect the input support device 3. When the frequency of the detection drive signal VD is set in accordance with the resonant frequency of the LC circuit 35, noise at a specific frequency (for example, X (kHz)) may cause false detection.

The resonant frequency control circuit 74 outputs a control signal Sc to the adjustment circuit 70 based on information of the changed detection frequency that has been supplied from the detection frequency setting circuit 73. The resonant frequency control circuit 74 controls the adjustment circuit 70 to cause the resonant frequency of the entire circuit including the LC circuit 35 of the input support device 3, the capacitance C1 between the first electrode 31 and the drive electrode Tx (refer to FIG. 4), the capacitance C2 between the second electrode 32 and the drive electrode Tx (refer to FIG. 4), and the adjustment circuit 70 coupled to the drive electrode Tx to match with or be approximated to the changed detection frequency (for example, X+Δx (kHz)).

Figure 7:
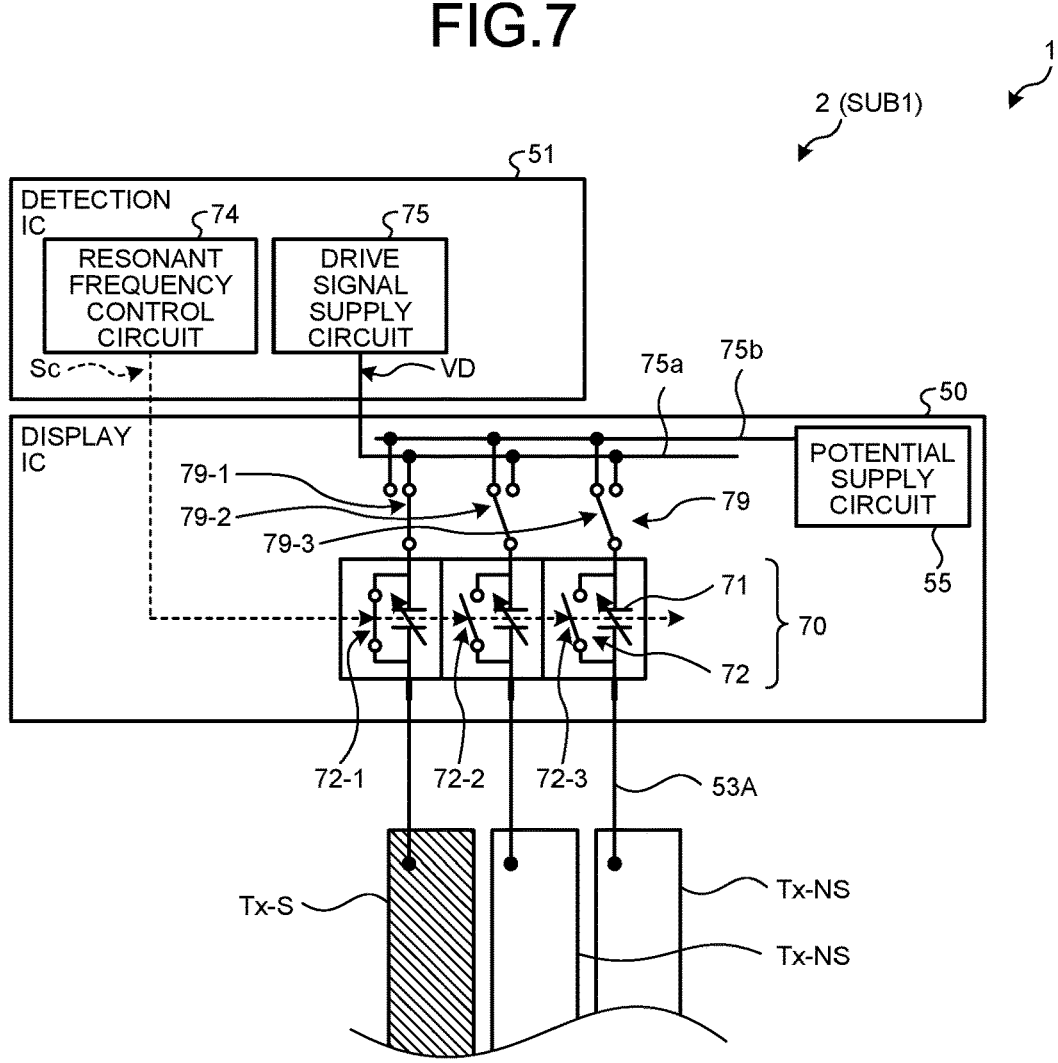
FIG. 7 is a descriptive view for explaining an example of the configuration of an adjustment circuit.

Next, the detailed configuration of the adjustment circuit 70 will be described. FIG. 7 is a descriptive view for explaining an example of the configuration of the adjustment circuit. As illustrated in FIG. 7, the capacitive element 71 and the switch element 72 of the adjustment circuit 70 are coupled to each of the drive electrodes Tx. One end of the capacitive element 71 is coupled to the drive electrode Tx. The other end of the capacitive element 71 is coupled to the drive signal supply circuit 75 of the detection IC 51 or a potential supply circuit 55 through a switch element 79.

The switch elements 79 and wiring lines 75*a* and 75*b* are included in the display IC 50. With operations of the switch elements 79, the drive electrode Tx to which the detection drive signal VD is supplied (hereinafter referred to as "drive electrode Tx-S") and the non-driven drive electrodes Tx to which the detection drive signal VD is not supplied (hereinafter referred to as "drive electrodes Tx-NS") are selected. When the switch element 79 is coupled to the wiring line 75*a* side, the drive electrode Tx-S is coupled to the drive signal supply circuit 75 through the adjustment circuit 70 and the wiring line 75*a*. When the switch element 79 is coupled to the wiring line 75*b* side, the non-driven drive electrode Tx-NS is coupled to the potential supply circuit 55 through the adjustment circuit 70 and the wiring line 75*b*. The potential supply circuit 55 supplies a predetermined potential and can switch a plurality of potentials for supply. More specifically, the potential supply circuit 55 supplies the ground potential GND to the wiring line during the periods where the drive electrodes Tx are used to detect the finger or the input support device 3 (detection periods (including a noise detection period), which will be described below) and supplies the display drive signal VCOM to the wiring line during a period where the drive electrodes Tx are used to display an image (a display period, which will be described below). The display drive signal VCOM may have a predetermined fixed potential or an AC waveform such as a predetermined pulse waveform.

One end of the switch element 72 is coupled to one end of the capacitive element 71, and the other end of the switch element 72 is coupled to the other end of the capacitive element 71. When the switch element 72 is turned on (coupled state) in the detection period, the one end side and the other end side of the capacitive element 71 are short-circuited. The ground potential GND is supplied to the wiring line 75*b*. In this case, no capacitance value Cv is formed between the drive electrode Tx and the drive signal supply circuit 75 or the reference potential GND. When the switch element 72 is turned off (non-coupled state), the capacitance value Cv is formed between the drive electrode Tx and the drive signal supply circuit 75 or the reference potential GND.

To be more specific, the resonant frequency control circuit 74 turns on the switch element 72 of the adjustment circuit 70 that is coupled to the drive electrode Tx-S. The detection drive signal VD is supplied to the drive electrode Tx-S from the drive signal supply circuit 75 without passing through the capacitive element 71. The resonant frequency control circuit 74 turns off the switch element 72 of the adjustment circuit 70 that is coupled to each non-driven drive electrode Tx-NS. The non-driven drive electrode Tx-NS is thereby coupled to the reference potential GND through the capacitive element 71.

ON and OFF of the switch elements 79 are controlled in order with a shift register or the like provided in the display IC 50, so that the drive electrodes Tx-S to which the detection drive signal VD is supplied are scanned in order. The resonant frequency control circuit 74 controls ON and OFF of each switch element 72 of the adjustment circuit 70 in synchronization with the operation of the corresponding switch element 79. With the above-mentioned operations, the adjustment circuit 70 adjusts the circuit constant (capacitance value Cv) of at least one of between the non-driven drive electrode Tx-NS and the reference potential GND and between the drive electrode Tx-S and the drive signal supply circuit 75 in accordance with the detection frequency.

Figure 8:
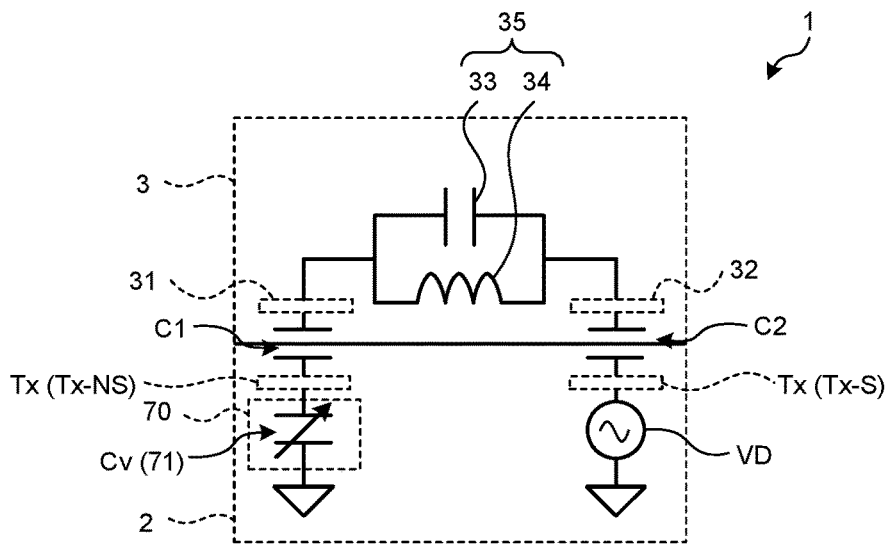
FIG. 8 is an equivalent circuit diagram schematically illustrating a relation between the input support device and drive electrodes of the display device.

FIG. 8 is an equivalent circuit diagram schematically illustrating a relation between the input support device and the drive electrodes Tx of the display device. FIG. 8 omits illustration of the switch elements 72 and the capacitive element 71 (capacitive element 71 on the drive electrode Tx-S side) that is short-circuited when the switch element 72 is turned on in the adjustment circuit 70. As illustrated in FIG. 8, when the input support device 3 is arranged above the display device 2, the capacitance C2 is formed between the second electrode 32 and the drive electrode Tx-S facing the second electrode 32. The capacitance C1 is formed between the first electrode 31 and the non-driven drive electrode Tx-NS facing the first electrode 31. The adjustment circuit 70 adds the capacitive element 71 (capacitance value Cv) in series with the capacitance C1. That is to say, in the present embodiment, the resonant frequency control circuit 74 uses the adjustment circuit 70 to apply capacitance to the non-driven drive electrode Tx, which is not the drive electrode Tx as a drive target in the detection period. As the non-driven drive electrode Tx to which the capacitance is applied, at least the drive electrode Tx located adjacent to the drive electrode Tx as the drive target is selected. The drive electrode Tx that is selected is however not limited thereto, and multiple non-driven drive electrodes Tx may be further selected or all the non-driven drive electrodes Tx may be selected.

The input detection system 1 can thereby change the circuit constant on the path from the drive signal supply circuit 75 to the reference potential GND through the adjustment circuit 70 (not illustrated in FIG. 8) on the drive electrode Tx-S side, the capacitance C2 (the drive electrode Tx-S and the second electrode 32), the LC circuit 35, the capacitance C1 (the first electrode 31 and the non-driven drive electrode Tx-NS), and the adjustment circuit 70.

The capacitive element 71 of the adjustment circuit 70 can change the capacitance value Cv in the multistage manner as described above and has, for example, the capacitance values Cv corresponding to the detection frequencies (for example, X (kHz), X+Δx (kHz), X+2Δx (kHz), and X+3Δx (kHz)) that the frequency table 78c (refer to FIG. 6) has. The resonant frequency control circuit 74 changes the capacitance value Cv such that the resonant frequency of the circuit including the capacitance value Cv, the capacitance C1, the LC circuit 35, and the capacitance C2 matches with the detection frequency or is approximated thereto to an extent that LC resonance occurs.

In the input detection system 1, when the frequency of the detection drive signal VD is changed to the detection frequency (X+Δx (kHz)) different from the frequency (for example, X (kHz)) of noise, the adjustment circuit 70 provided in the display device 2 can adjust the resonant frequency of the circuit including the input support device 3 and the adjustment circuit 70 to, for example, X+Δx (kHz). With the adjustment, even with a configuration where the input support device 3 does not include a power supply or a variable element, the resonant frequency can be easily adjusted by the adjustment circuit 70 provided in the display device 2 while keeping the circuit constant of the LC circuit 35 included in the input support device 3 constant. The input detection system 1 can therefore prevent false detection caused by external noise when detecting the input support device 3. In addition, the input support device 3 requires no power supply and no variable element for noise reduction, so that the circuit configuration of the input support device 3 can be simplified.

The adjustment circuit 70 couples the capacitive elements 71 (capacitance values Cv) to the non-driven drive electrodes Tx-NS, and the capacitive element 71 (refer to FIG. 7) coupled to the drive electrode Tx-S is short-circuited by the switch element 72. In other words, the detection drive signal VD is supplied to the drive electrode Tx-S without passing through the capacitive element 71 (capacitance value Cv). Accordingly, detection accuracy of the input detection system 1 can be improved because delay of the detection drive signal VD, lulling of the waveform, and the like due to the presence of the capacitive element 71 (capacitance value Cv) can be prevented.

Figure 9:
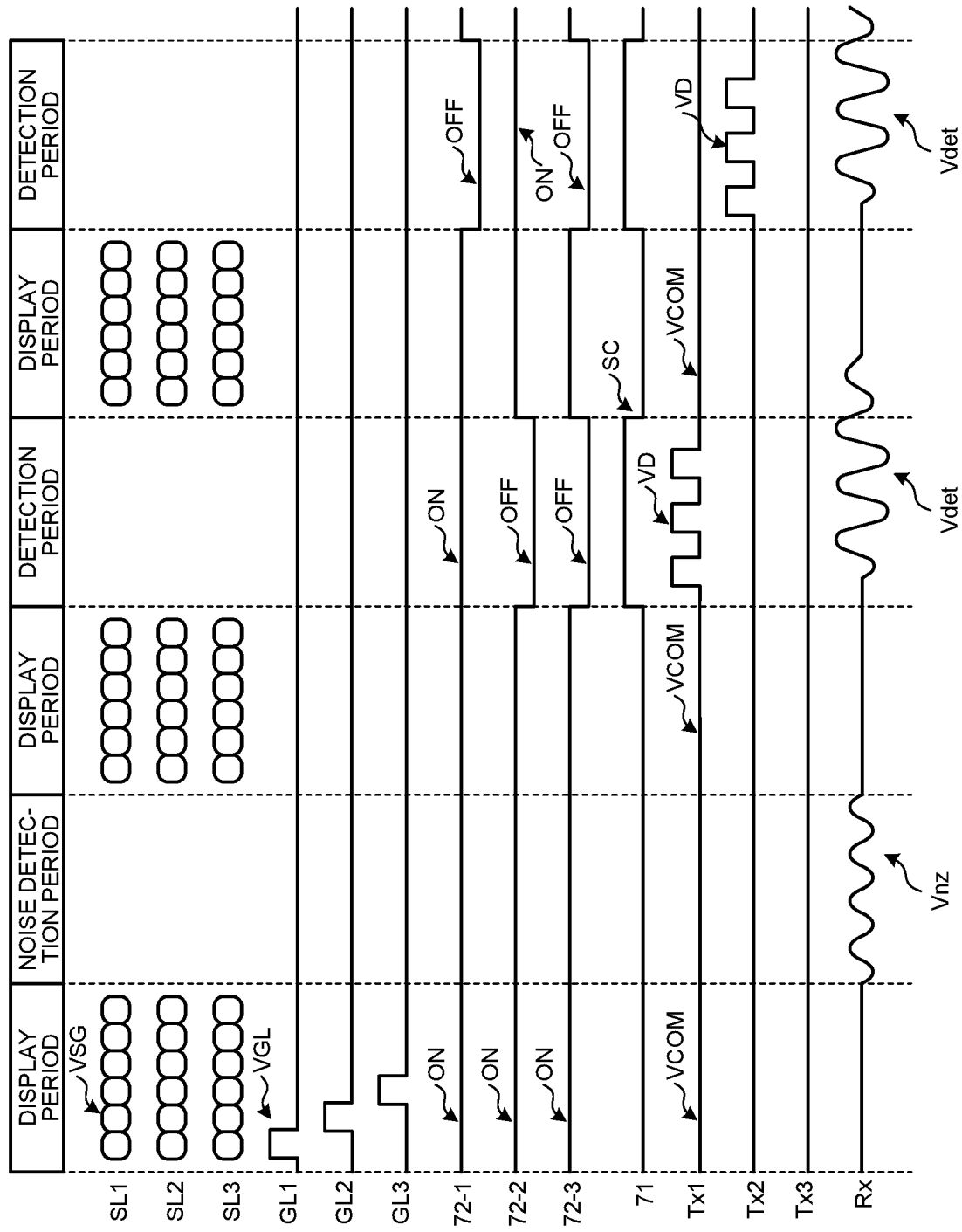
FIG. 9 is a timing waveform chart for explaining a display period, a noise detection period, and a detection period of the input detection system.

FIG. 9 is a timing waveform chart for explaining the display period, the noise detection period, and the detection period of the input detection system. As illustrated in FIG. 9, the display IC 50 and the detection IC 51 of the input detection system 1 execute the display periods, the noise detection period, and the detection periods alternately in a time division manner. FIG. 9 is merely a schematically illustrated timing waveform chart, and the length of each period and the number of pixel signal lines SL, scan lines GL, and drive electrodes Tx, for example, are not limited thereto. The display period, the noise detection period, and the detection period may be arranged in any way. For example, display and detection may be repeated every frame.

Drive electrodes Tx1, Tx2, and Tx3 illustrated in FIG. 9 indicate three adjacent drive electrodes Tx (refer to, for example, the drive electrodes Tx in FIG. 7) among the drive electrodes Tx. Switch elements 72-1, 72-2, and 72-3 indicate the switch elements 72 included in the adjustment circuit 70 and coupled to the drive electrodes Tx1, Tx2, and Tx3, respectively.

In the display period, the scan line drive circuit 52 supplies the scan signal VGL to the scan lines GL1, GL2, GL3, and the like in order. The display IC 50 supplies pixel signals VSG to the pixel signal lines SL1, SL2, SL3, and the like based on the image signal from the host IC 100. The pixel signals VSG are thereby supplied in order to the pixels PX selected based on the scan signal VGL, so that an image is displayed. The potential supply circuit 55 of the display IC 50 supplies the display drive signal VCOM to all the drive electrodes Tx through the wiring line 75b and the switch elements 79 during the display period. The drive electrodes Tx thereby function as the common electrodes in the display period.

The adjustment circuit 70 turns on the switch elements 72 that are coupled to all the drive electrodes Tx during the display period. The capacitive elements 71 coupled to all the drive electrodes Tx are thereby short-circuited by the switch elements 72, and the display drive signal VCOM is supplied to all the drive electrodes Tx without passing through the capacitive elements 71. The pixel signals VSG for one frame (one display region overall) may be written in one display period, or the pixel signals VSG for a portion provided by dividing one frame into a plurality of regions may be written in one display period.

When entering the noise detection period, all the switch elements 79 are switched from the wiring line 75b to the wiring line 75a. The detection IC 51 (drive signal supply circuit 75) supplies no detection drive signal VD to all the drive electrodes Tx and brings them into non-driven states. The fixed potential (for example, the reference potential GND) is supplied to all the drive electrodes Tx. Alternatively, all the switch elements 79 may be coupled to the wiring line 75b, and the fixed potential (for example, the display drive signal VCOM or the reference potential GND) may be supplied from the potential supply circuit 55. The drive electrodes Tx may also be brought into the floating states. In this state, the detection circuit 76 detects output signals Vnz from the detection electrodes Rx and outputs them to the arithmetic circuit 77. The arithmetic circuit 77 calculates the presence or absence of noise and a noise frequency by performing signal processing on an output signal Vo' from the detection circuit.

In the detection period, the detection drive signal VD is supplied in order to the drive electrodes Tx1, Tx2, and Tx3 by switching coupling of the switch elements 79 from the wiring line 75b to 75a in order. The potential supply from the potential supply circuit is switched from the display drive signal VCOM to the ground potential GND. The switch elements 79 and the adjustment circuit 70 switch the coupling states of the switch elements 72 between the display period and the detection period. More in detail, ON and OFF of the switch elements 79-1, 79-2, and 79-3 and the switch elements 72-1, 72-2, and 72-3 are switched in accordance with driving or non-driving of the drive electrodes Tx1, Tx2, and Tx3. As illustrated in FIG. 7, for example, coupling of the switch element 79-1 is switched from the wiring line 75b to the wiring line 75a whereas the switch elements 79-2 and 79-3 are kept being coupled to the wiring line 75b in the detection period where the detection drive signal VD is supplied to the drive electrode Tx1 and the drive electrodes Tx2 and Tx3 are not driven. Simultaneously, the switch element 72-1 is controlled to be turned on and the switch elements 72-2 and 72-3 are controlled to be turned off. The capacitive elements 71 adjust the capacitance values Cv in accordance with the control signal Sc from the resonant frequency control circuit 74.

Although in FIG. 9, the drive electrode Tx1, Tx2, or Tx3 is driven in each detection period, FIG. 9 is schematically illustrated. Alternatively, the multiple drive electrodes Tx may be driven in one detection period, or all the drive electrodes Tx (one detection frame) may be driven in order in one detection period. Since the input support device 3 outputs the detection signals Vdet using the resonance of the LC circuit 35, it outputs the detection signals Vdet also after the detection period and during a period overlapping with a part of the display period. The noise detection period may be provided in any way. One noise detection period may be provided in one frame period in which display for one frame is performed, or multiple noise detection periods may be provided in one frame period.

Figure 10:
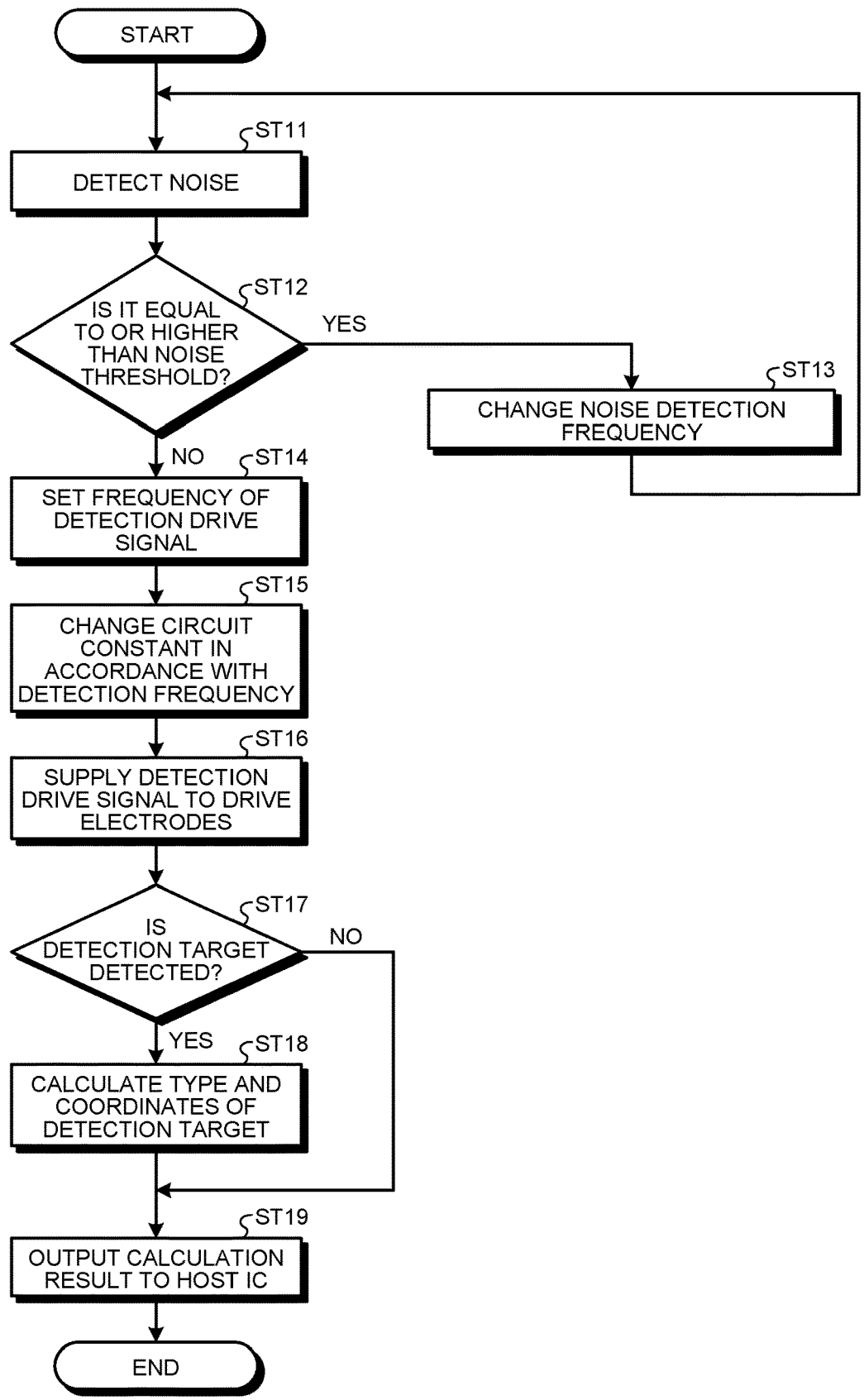
FIG. 10 is a flowchart illustrating an example of operations of the input detection system.

Next, a method for controlling the adjustment circuit 70 of the input detection system 1 will be described with reference to FIG. 6 and FIG. 10. FIG. 10 is a flowchart illustrating an example of operations of the input detection system. As illustrated in FIG. 10, the detection electrodes Rx detect external noise in the noise detection period (step ST11). More specifically, the detection electrodes Rx output, to the detection circuit 76, the output signals Vnz in the noise detection period. It is supposed in this example that the output signal contains noise and the output signal containing the noise is the noise detection signal Vnz. The detection circuit 76 performs the signal processing on the noise detection signals Vnz and outputs the result as the output signal Vo' to the arithmetic circuit 77. As described above, since the drive electrodes Tx are not driven during the noise detection period, the frequency of the output signal Vo' from the detection circuit 76 is equal to a sampling frequency when the noise detection signals Vnz are sampled in the signal processing of the detection circuit 76. The sampling frequency that is used for noise detection in the noise detection period is hereinafter referred to as a noise detection frequency. At the current step ST11, the noise detection frequency X (kHz) is adopted. The arithmetic circuit 77 compares the output signal Vo' sampled at the noise detection frequency X (kHz) with the noise threshold stored in the arithmetic reference value 78d in the storage circuit 78 (step ST12).

When the output signal Vo' is equal to or higher than the noise threshold (Yes at step ST12), the arithmetic circuit 77 determines that noise is present at the frequency of the output signal Vo' (that is, the noise detection frequency X (kHz)) and outputs the determination result to the detection frequency setting circuit 73. Upon reception of the determination result, the detection frequency setting circuit 73 changes the noise detection frequency to a frequency (for example, X+Δx (kHz)) different from the current noise frequency (X (kHz)) in order to change the sampling frequency of the detection circuit based on information from the frequency table 78c in the storage circuit 78 (step ST13). The detection circuit 76 receives information of the changed noise frequency from the detection frequency setting circuit 73 and repeatedly executes the above-mentioned noise detection (steps ST11 and ST12) at the changed noise detection frequency (X+Δx (kHz)).

When the output signal Vo' sampled by the detection circuit 76 using the noise detection frequency (X+Δx (kHz)) is lower than the noise threshold (No at step ST12), the arithmetic circuit 77 determines that noise is reduced at the noise detection frequency (X+Δx (kHz)). The arithmetic circuit 77 then outputs the determination result to the detection frequency setting circuit 73. The detection frequency setting circuit 73 maintains the current noise detection frequency (X+Δx (kHz)) in response to the determination result.

The drive signal supply circuit 75 changes the frequency of the detection drive signal VD in accordance with the information about the detection frequency that has been received from the detection frequency setting circuit 73 (step ST14).

The resonant frequency control circuit 74 changes the circuit constant (capacitance value Cv of the capacitive element 71) of the adjustment circuit 70 in accordance with the information about the detection frequency that has been received from the detection frequency setting circuit 73 (step ST15). More in detail, the resonant frequency control circuit 74 calculates the capacitance value Cv such that the resonant frequency of the circuit including the capacitance value Cv, the capacitance C1, the LC circuit 35, and the capacitance C2 (refer to FIG. 8) matches with or is approximated to the changed detection frequency (for example, X+Δx (kHz)) and outputs the control signal Sc to the adjustment circuit 70.

Then, the detection drive signal VD is supplied in order to the drive electrode Tx in each detection period (step ST16). The detection circuit 76 and the arithmetic circuit 77 receive the detection signals Vdet from the detection electrodes Rx and perform the above-mentioned signal processing thereon to detect the detection target such as the input support device 3 and the finger Fg (step ST17).

In each detection period, the detection circuit 76 samples the output signal Vo from the detection electrodes Rx using the same frequency as the detection frequency (X+Δx (kHz)) as the sampling frequency based on the information about the detection frequency that has been received from the detection frequency setting circuit 73. The configuration in which the detection drive signal VD having the changed frequency (X+Δx (kHz)) is supplied from the drive signal supply circuit 75 as the sampling signal can also be adopted.

When the detection target such as the input support device 3 and the finger Fg is detected (Yes at step ST17), the arithmetic circuit 77 calculates the type of the detection target and the information about the input operation by the finger Fg or the input support device 3 (for example, the position coordinates of the finger Fg or the position coordinates and the rotation operation RT of the input support device 3) (step ST18). The arithmetic circuit 77 outputs the calculation results to the host IC 100 (step ST19). The host IC 100 outputs a control signal to the display IC 50 to perform display in accordance with the input operation by the finger Fg or the input support device 3.

When the detection target such as the input support device 3 and the finger Fg is not detected (No at step ST17), the display IC 50 and the detection IC 51 output the result to the host IC 100, and then, repeatedly execute the noise detection and the detection of the detection target as described above.

As described above, the input detection system 1 in the present embodiment includes the display device 2 (detection device) including the drive electrodes Tx (sensor electrodes) arrayed in the display region DA (detection region), the input support device 3 including the LC circuit 35, the first electrode 31 coupled to one end side of the LC circuit 35, and the second electrode 32 coupled to the other end side of the LC circuit 35, and the display IC (control circuit) including the drive signal supply circuit 75 configured to supply the detection drive signal VD to the drive electrodes Tx and the adjustment circuit 70 coupled to the drive electrodes Tx. The adjustment circuit 70 adjusts the circuit constant that is added to the capacitance between the drive electrode Tx and the first electrode 31 or the second electrode 32 facing the drive electrode Tx.

The input detection system 1 can thereby detect the finger Fg or the input support device 3 by changing the detection frequency to that different from the noise frequency when external noise enters. The input detection system 1 can adjust, by the adjustment circuit 70 provided in the display device 2, the capacitance value Cv such that the resonant frequency in accordance with the changed detection frequency is set, thereby detecting the input support device 3 preferably. The input detection system 1 can therefore prevent false detection caused by the external noise.

In the present embodiment, the adjustment circuit 70 applies the capacitances to the non-driven drive electrodes Tx that are not coupled to the drive signal supply circuit 75 in the detection period. Conversely, the adjustment circuit 70 can apply capacitance to the drive electrode Tx coupled to the drive signal supply circuit 75 without applying the capacitances to the non-driven drive electrodes Tx.

In the above-mentioned example, the resonant frequency of the circuit in detection of the input support device 3 is changed in accordance with the frequency of the noise. The frequency of the detection drive signal VD may however be set to a non-resonant frequency different from the above-mentioned resonant frequency when the input detection system 1 is used to detect another detection target such as the finger Fg instead of the input support device 3 in a predetermined detection period. In this case, the configuration in which the non-resonant frequency is changed in accordance with the frequency of the noise can also be adopted.

First Modification

Figure 11:
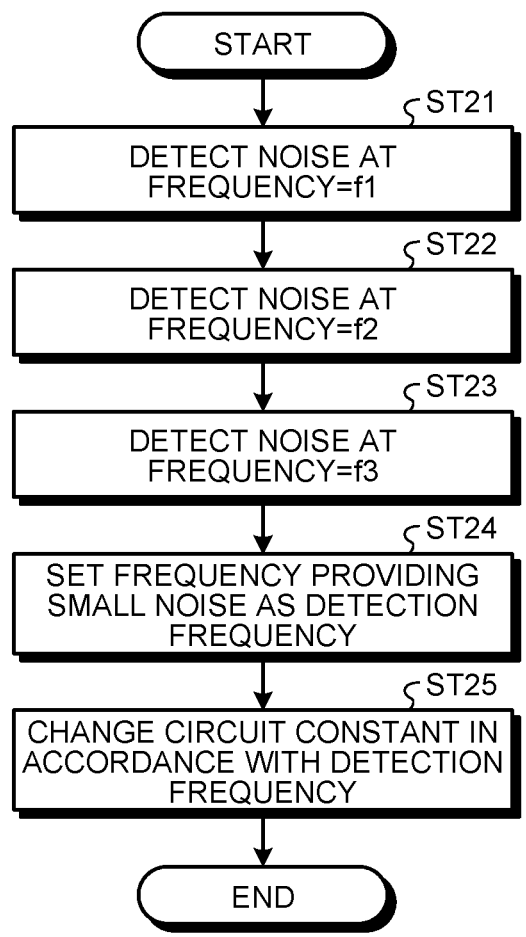
FIG. 11 is a flowchart illustrating an example of operations of an input detection system according to a first modification.

FIG. 11 is a flowchart illustrating an example of operations of an input detection system according to a first modification. In the following explanation, the same reference numerals denote the same components described in the above-mentioned embodiment and repeated explanation thereof is omitted.

In the example illustrated in FIG. 10, the arithmetic circuit 77 samples the output from the detection electrodes Rx using the predetermined noise detection frequency, compares the output signal Vo' with the noise threshold, and determines whether or not to identify the noise detection frequency again in accordance with the comparison result. The operation is however not limited thereto. As illustrated in FIG. 11, in the first modification, the detection circuit 76 and the arithmetic circuit 77 perform noise detection in order at a plurality of different frequencies f1, f2, and f3 (steps ST21, ST22, and ST23). In other words, the detection circuit 76 detects a plurality of types of output signals Vo' by varying the sampling frequency of the noise detection signals Vnz in one or more noise detection periods.

The frequencies f1, f2, and f3 are stored in advance in the frequency table 78c in the storage circuit 78. The frequencies f1, f2, and f3 include the current detection frequency (for example, X (kHz)) and frequencies (for example, X+Δx (kHz) and X+2Δx (kHz)) different from the current detection frequency. The detection circuit 76 and the arithmetic circuit 77 may also perform noise detection at two or four or more frequencies.

The arithmetic circuit 77 compares the output signals Vo' at the frequencies f1, f2, and f3 and sets the frequency providing the smallest output signal Vo (voltage value) as the detection frequency (step ST24). The resonant frequency control circuit 74 changes the circuit constant (capacitance value Cv of the capacitive element 71) of the adjustment circuit 70 in accordance with the information about the detection frequency that has been received from the detection frequency setting circuit 73 (step ST25). Hereinafter, the detection object such as the input support device 3 and the finger Fg is detected at the changed detection frequency similarly to step ST16 in FIG. 10.

Figure 12:
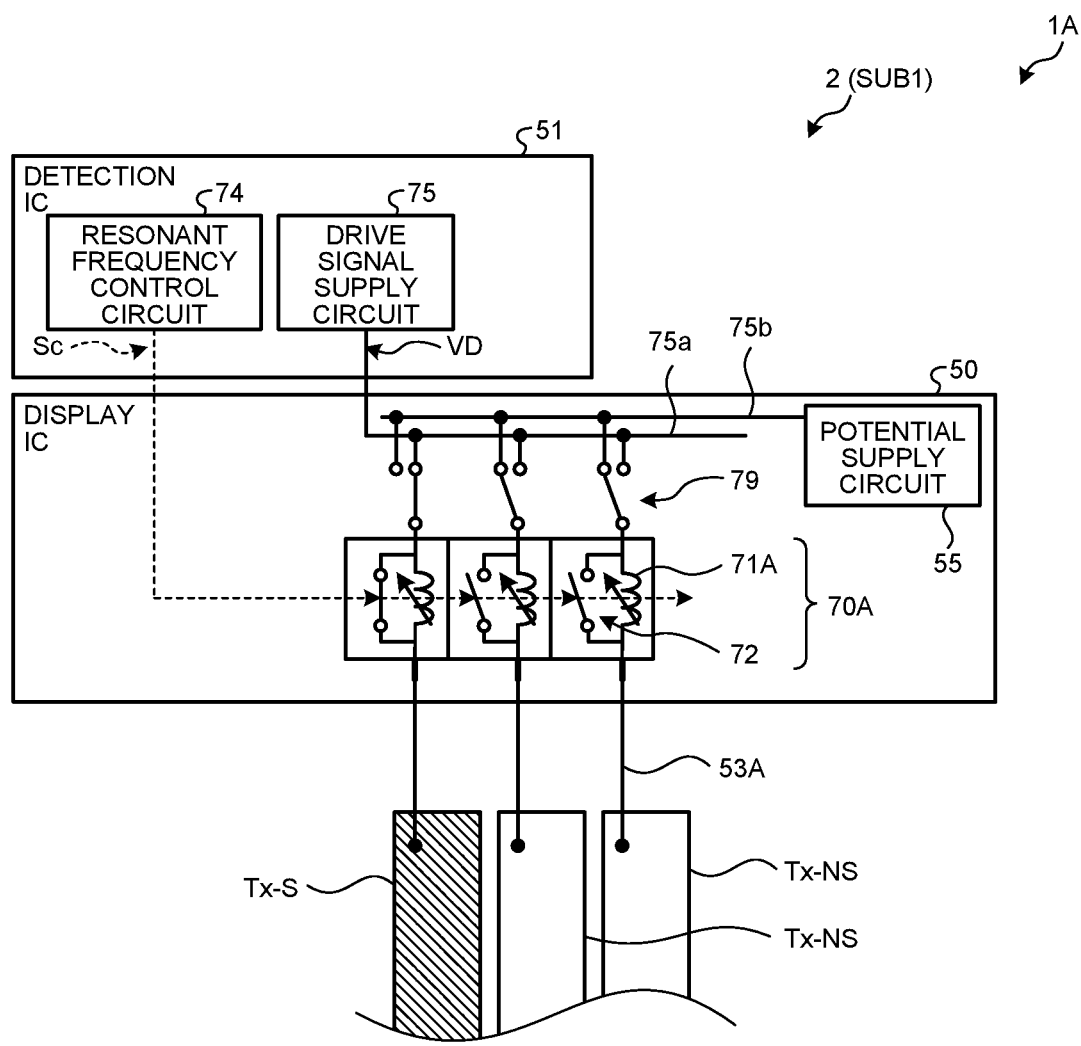
FIG. 12 is a descriptive view for explaining an example of the configuration of an adjustment circuit in an input detection system according to a second modification.

Second Modification FIG. 12 is a descriptive view for explaining an example of the configuration of an adjustment circuit in an input detection system according to a second modification. In the first embodiment described above, the adjustment circuit 70 includes the capacitive element 71 as the element coupled to each drive electrode Tx. The adjustment circuit is however not limited thereto. As illustrated in FIG. 12, in an input detection system 1A in the second modification, an adjustment circuit 70A includes at least one or more inductance element 71A coupled to the drive electrode Tx (sensor electrode) and the switch element 72 coupled in parallel with the inductance element 71A. The adjustment circuit 70A is a circuit configured to adjust a circuit constant (for example, an inductance value Lv) that is added to the capacitance C1 or C2 (refer to FIG. 13) between the drive electrode Tx and the first electrode 31 or the second electrode 32 facing the drive electrode Tx.

The resonant frequency control circuit 74 controls the switch elements 72 and the inductance values Lv of the inductance elements 71A in a similar manner to that in the first embodiment. With the control, the inductance elements 71A (inductance values Lv) are coupled to the non-driven drive electrodes Tx-NS, and the inductance element 71A coupled to the drive electrode Tx-S is short-circuited by the switch element 72.

Figure 13:
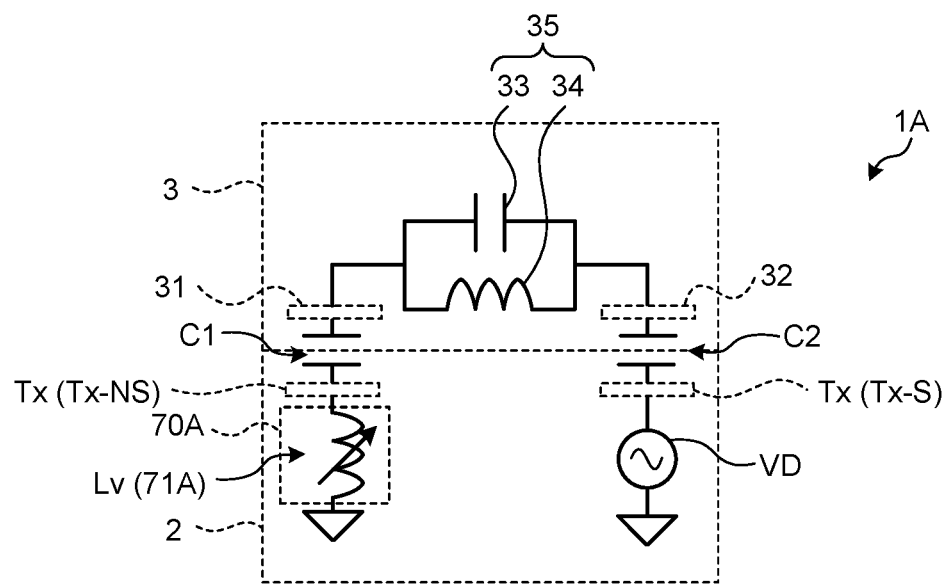
FIG. 13 is an equivalent circuit diagram schematically illustrating a relation between an input support device and drive electrodes of a display device in the input detection system in the second modification.

FIG. 13 is an equivalent circuit diagram schematically illustrating a relation between an input support device and the drive electrodes of a display device in the input detection system in the second modification. As illustrated in FIG. 13, when the input support device 3 is arranged above the display device 2, the adjustment circuit 70 applies the inductance value Lv (inductance element 71A) in series to the capacitance C1 between the first electrode 31 and the drive electrode Tx-NS facing the first electrode 31.

The input detection system 1A can thereby change the circuit constant on the path from the drive signal supply circuit 75 to the reference potential GND through the adjustment circuit 70A (not illustrated in FIG. 13) on the drive electrode Tx-S side, the drive electrode Tx-S, the second electrode 32, the LC circuit 35, the first electrode 31, the non-driven drive electrode Tx-NS, and the adjustment circuit 70A.

The inductance element 71A of the adjustment circuit 70 can change the inductance value Lv in a multistage manner and has, for example, the inductance values Lv corresponding to detection frequencies (for example, X (kHz), X+Δx (kHz), X+2Δx (kHz), and X+3Δx (kHz)) that the frequency table 78c (refer to FIG. 6) has. The resonant frequency control circuit 74 changes the inductance value Lv such that the resonant frequency of the circuit including the inductance value Lv, the capacitance C1, the LC circuit 35, and the capacitance C2 matches with or is approximated to the detection frequency.

Third Modification

Figure 14:
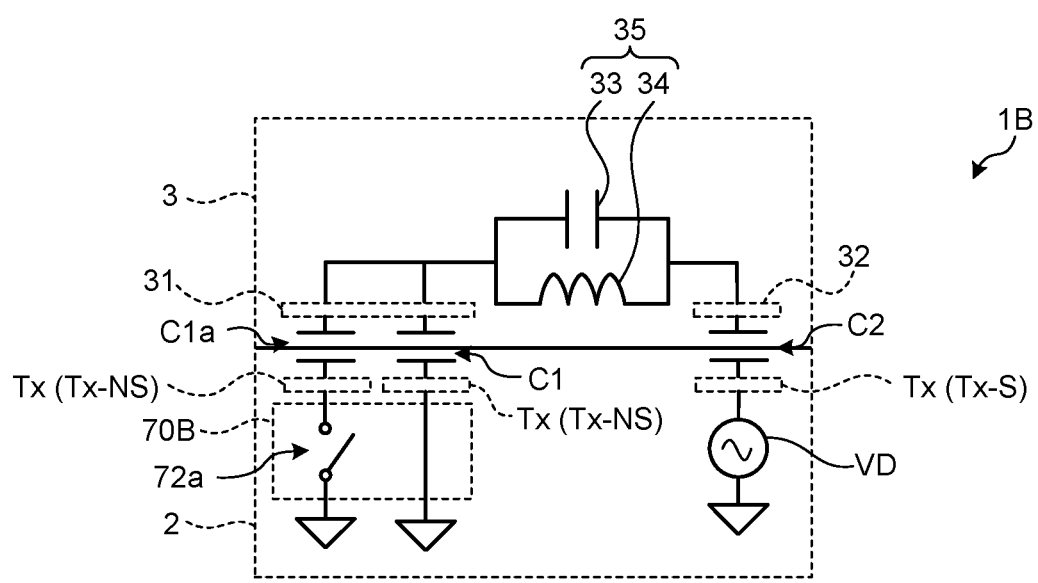
FIG. 14 is an equivalent circuit diagram schematically illustrating a relation between an input support device and drive electrodes of a display device in an input detection system according to a third modification.
Figure 15:
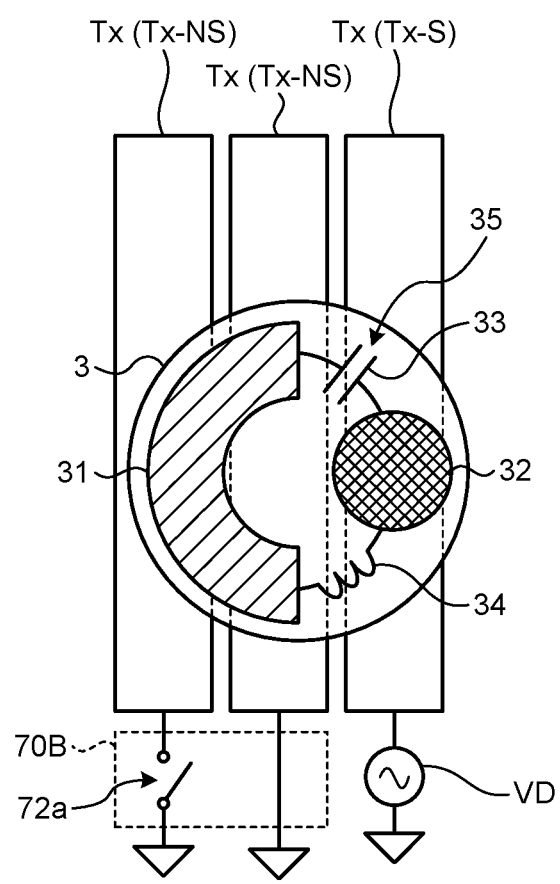
FIG. 15 is a plan view schematically illustrating the relation between the input support device and the drive electrodes of the display device in the input detection system in the third modification.

FIG. 14 is an equivalent circuit diagram schematically illustrating a relation between an input support device and drive electrodes of a display device in an input detection system according to a third modification. FIG. 15 is a plan view schematically illustrating the relation between the input support device and the drive electrodes of the display device in the input detection system in the third modification. As illustrated in FIGS. 14 and 15, the drive electrodes Tx are arranged so as to face the first electrode 31 and one drive electrode Tx is arranged so as to face the second electrode 32 in an input detection system 1B in the third modification. As illustrated in FIG. 15, the first electrode 31 is larger than the second electrode 32 and has a C shape along an outer shape of the input support device 3. An adjustment circuit 70B in the third modification includes a switch element 72a coupled between the drive electrodes Tx and a reference potential.

When the switch element 72a is turned off based on the control signal Sc from the resonant frequency control circuit 74, one drive electrode Tx (the drive electrode Tx on the left side in FIGS. 14 and 15) facing the first electrode 31 is not coupled to the reference potential. In this case, the drive electrode Tx on the left side in FIGS. 14 and 15 is made into a floating state, and no capacitance C1a is formed between the drive electrode Tx and the first electrode 31. The capacitance C1 is formed between the first electrode 31 and the drive electrode Tx (the second drive electrode Tx from the left side in FIGS. 14 and 15) facing the first electrode 31.

When the switch element 72a is turned on based on the control signal Sc from the resonant frequency control circuit 74, the two drive electrodes Tx facing the first electrode 31 are coupled to the reference potential. In this case, the capacitance C1 is formed between the first electrode 31 and the drive electrode Tx (the second drive electrode Tx from the left side in FIGS. 14 and 15) facing the first electrode 31. The capacitance C1a is further formed between the first electrode 31 and the drive electrode Tx (the drive electrode Tx on the left side in FIGS. 14 and 15) facing the first electrode 31.

In the third modification, the number (area) of drive electrodes Tx facing the first electrode 31 can be adjusted by switching ON and OFF of the switch element 72a of the adjustment circuit 70B. The adjustment circuit 70B can thereby add the capacitance C1a in parallel with the capacitance C1 formed between the first electrode 31 and the drive electrode Tx (the second drive electrode Tx from the left side in FIGS. 14 and 15) facing the first electrode 31. Accordingly, the present modification can adjust the resonant frequency of a circuit including the adjustment circuit 70B and the input support device 3.

Although not illustrated in FIGS. 14 and 15, the adjustment circuit 70B is provided also on the drive electrode Tx-S side to which the detection drive signal VD is supplied. The drive electrodes Tx-S may be arranged so as to face the second electrode 32, and the number (area) of the drive electrodes Tx-S facing the second electrode 32 may be adjusted by the switch element 72a of the adjustment circuit 70B.

Second Embodiment

Figure 16:
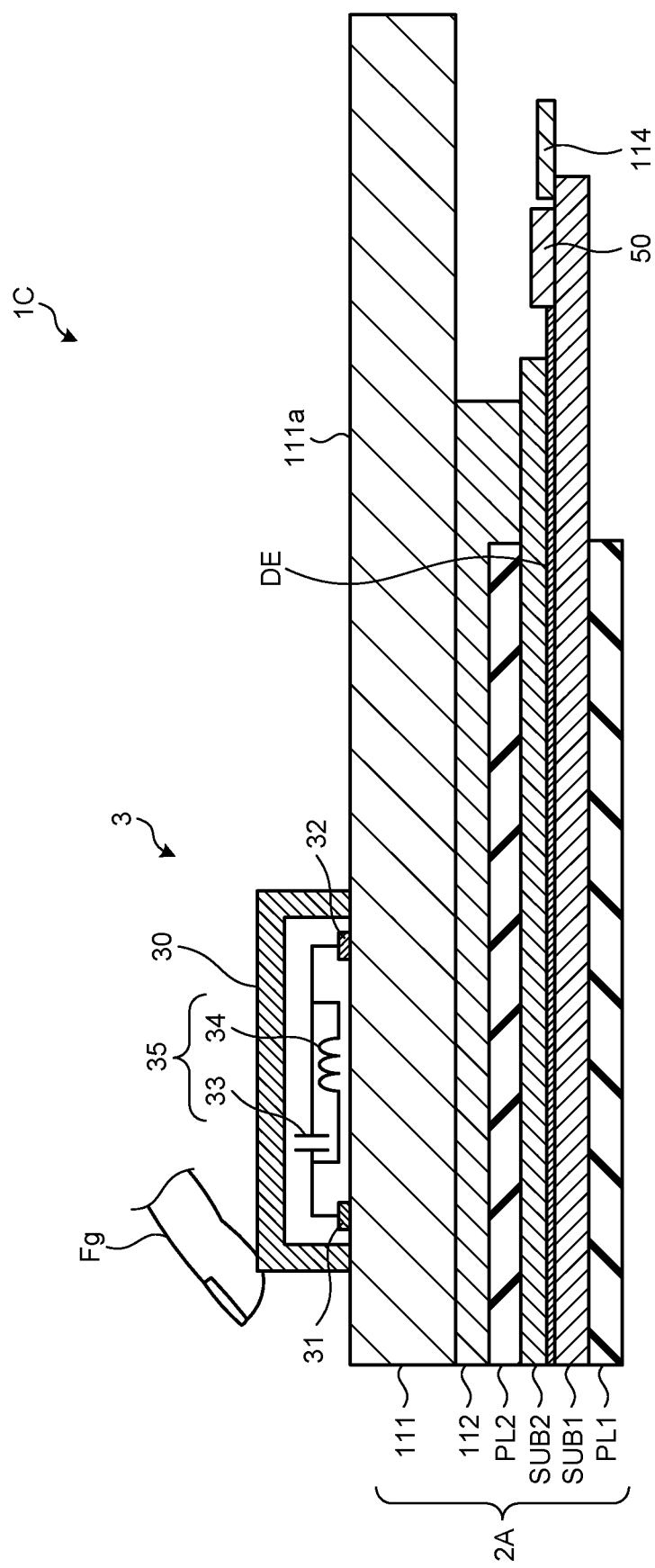
FIG. 16 is a cross-sectional view illustrating a schematic cross-sectional structure of an input detection system according to a second embodiment.

FIG. 16 is a cross-sectional view illustrating a schematic cross-sectional structure of an input detection system according to a second embodiment. The above-mentioned first embodiment has described the example in which the input support device 3 is arranged above the display device 2 including the mutual electrostatic capacitance-type touch sensor with the drive electrodes Tx and the detection electrodes Rx. The configuration is however not limited thereto. The touch sensor (display device 2) may be of a self-electrostatic capacitance type (self-type).

As illustrated in FIG. 16, a display device 2A has a plurality of detection electrodes DE (sensor electrodes) provided above the array substrate SUB1 in an input detection system 1C in the second embodiment. The detection electrodes DE serve as both of common electrodes in display and electrodes for detecting a detection target such as the input support device 3 and the finger Fg. In the second embodiment, the detection electrodes Rx, the detection IC 51, and the wiring substrate 115 (refer to FIG. 2) are not provided on the counter substrate SUB2 unlike the first embodiment.

Figure 17:
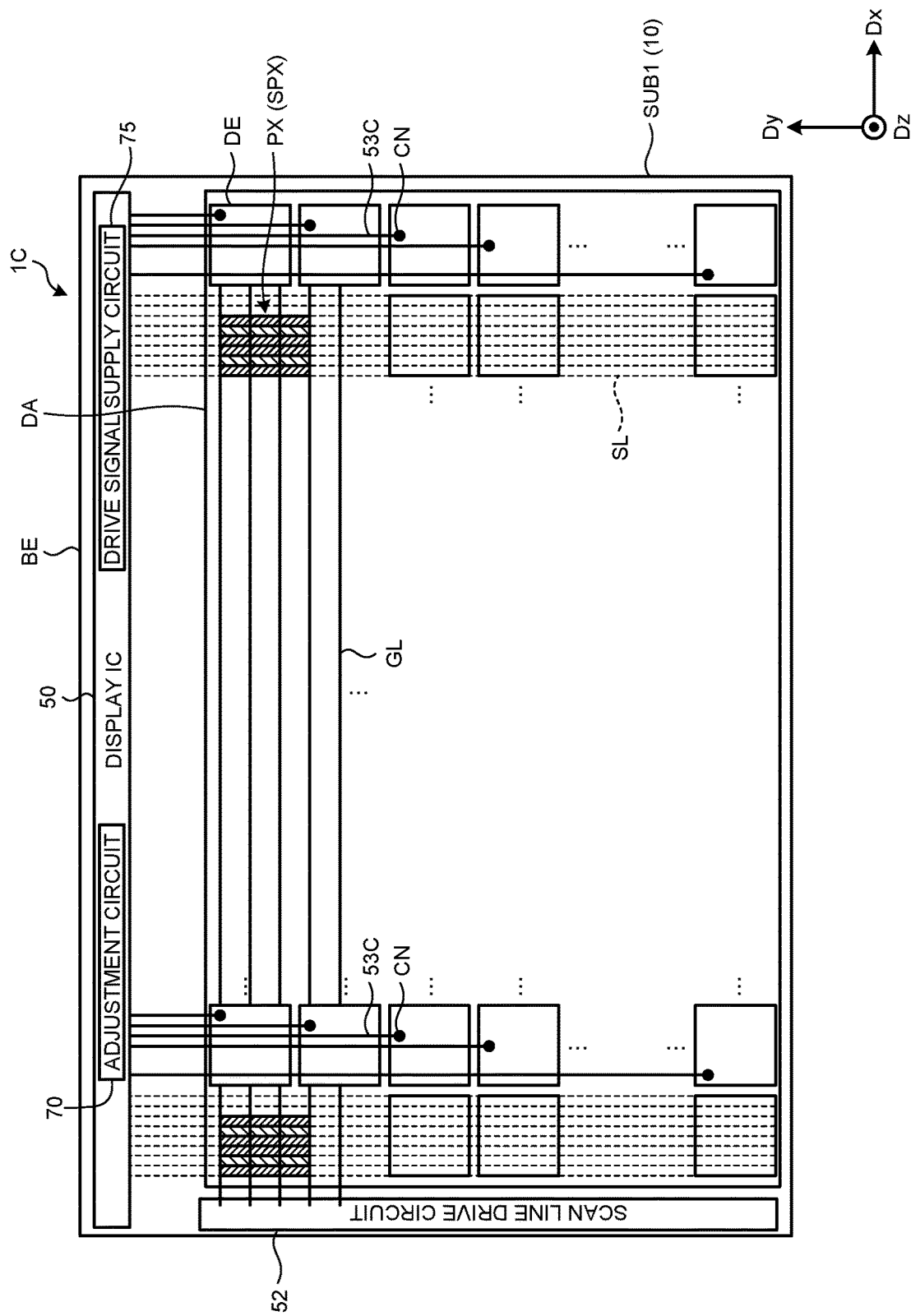
FIG. 17 is a plan view schematically illustrating an array substrate of the input detection system in the second embodiment.

FIG. 17 is a plan view schematically illustrating an array substrate of the input detection system in the second embodiment. As illustrated in FIG. 17, the detection electrodes DE are arrayed in a matrix with a row-column configuration in the display region DA of the array substrate SUB1. Wiring lines 53C are provided so as to correspond to the respective detection electrodes DE and are coupled to the detection electrodes DE through contact holes CN. Each of the wiring lines 53C extends along the second direction Dy and is aligned in the first direction Dx. The wiring lines 53C and the pixel signal lines SL are coupled to the display IC 50 provided in the peripheral region BE.

In the present embodiment, the display IC 50 has the functions of the circuits included in the detection IC 51 illustrated in FIG. 6. The configuration is however not limited thereto, and the detection IC 51 may be provided separately from the display IC 50 as in the first embodiment.

The drive signal supply circuit 75 of the display IC 50 supplies the display drive signal VCOM to the detection electrodes DE simultaneously in the display period. The display IC 50 (drive signal supply circuit 75) supplies the detection drive signal VD to the detection electrodes DE in the detection period. The detection electrodes DE output the detection signals Vdet based on changes in the self-capacitances to the detection circuit 76 (refer to FIG. 6) that the display IC 50 includes. The display IC 50 thereby detects the finger Fg or the input support device 3.

More specifically, in touch detection where the finger Fg or the like is detected, the display IC 50 (drive signal supply circuit 75) supplies the detection drive signal VD to the detection electrodes DE simultaneously. In detection of the input support device 3, the display IC 50 (drive signal supply circuit 75) supplies the detection drive signal VD to the detection electrodes DE in order and uses changes in the self-capacitances of the detection electrodes DE and resonance of the input support device 3 and the adjustment circuit 70 to detect the position and the like of the input support device 3.

Figure 18:
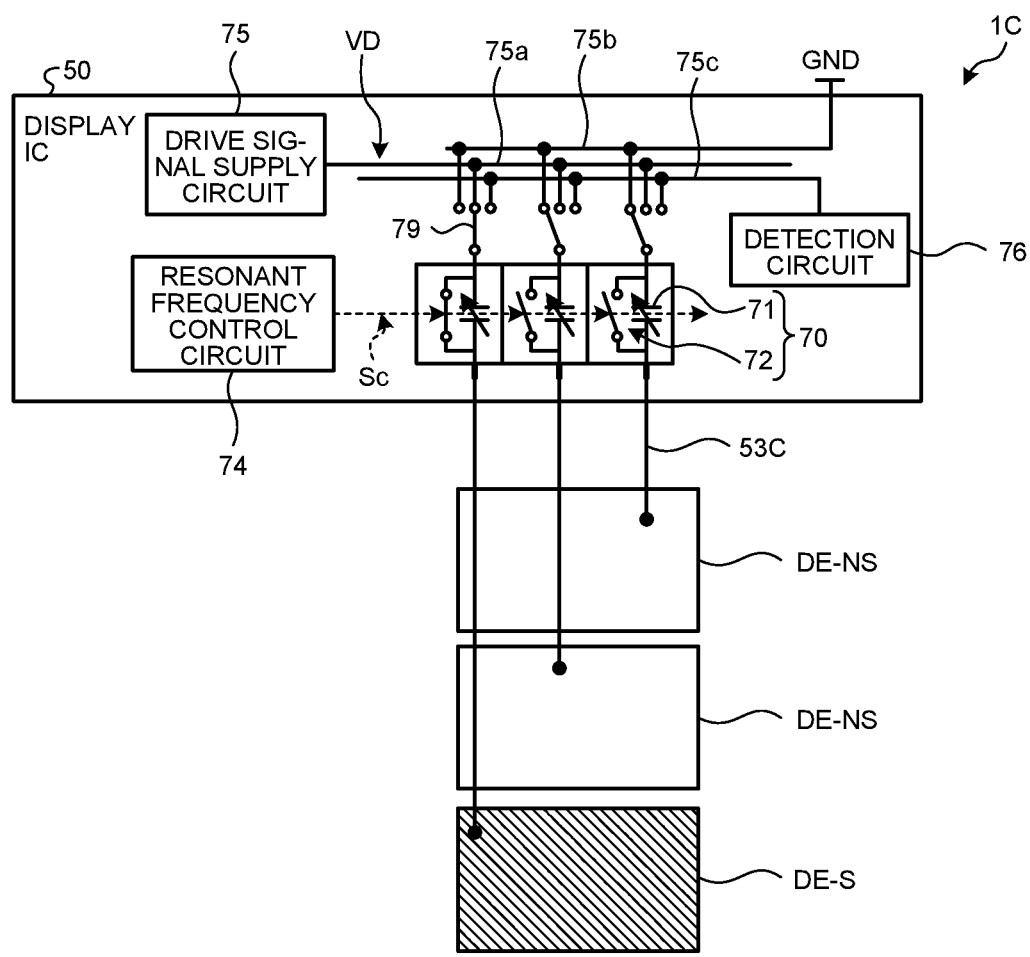
FIG. 18 is a descriptive view for explaining an example of the configuration of an adjustment circuit in the input detection system in the second embodiment.

FIG. 18 is a descriptive view for explaining an example of the configuration of the adjustment circuit in the input detection system in the second embodiment. As illustrated in FIG. 18, the capacitive element 71 and the switch element 72 of the adjustment circuit 70 are coupled to each of the detection electrodes DE. One end of the capacitive element 71 is coupled to the detection electrode DE through the wiring line 53C. The other end of the capacitive element 71 is coupled to the drive signal supply circuit 75, the reference potential GND, or the detection circuit 76 of the detection IC 51 through the switch element 79.

In the present embodiment, a wiring line 76c is provided in addition to the wiring lines 75a and 75b. When the switch element 79 is coupled to the wiring line 75a side, a detection electrode DE-S to which the detection drive signal VD is supplied is coupled to the drive signal supply circuit 75 through the switch element 72 of the adjustment circuit 70 and the wiring line 75a. Then, the switch element 79 is coupled to the wiring line 75c side, and the detection electrode DE-S to which the detection drive signal VD has been supplied is coupled to the detection circuit 76 through the wiring line 75c. Each non-driven detection electrode DE-NS to which the detection drive signal VD is not supplied is coupled to the reference potential GND through the adjustment circuit 70 (capacitive element 71) and the wiring line 75b.

Thus, also in the self-capacitance-type display device 2A (touch sensor), the capacitance value Cv of the capacitive element 71 can be added to the capacitance C1 formed between the first electrode 31 (or the second electrode 32) and the detection electrode DE facing the first electrode 31 (or the second electrode 32) by the adjustment circuit 70.

In FIG. 18, the adjustment circuit 70 including the capacitive element 71 is illustrated. The adjustment circuit 70 is however not limited thereto. The present embodiment can also employ the adjustment circuit 70A or 70B in the second modification and the third modification described above. The method for detecting noise described in the first embodiment and the first modification can also be employed in the second embodiment.

Although the preferred embodiments of the present disclosure have been described above, the present disclosure is not limited by these embodiments. Contents disclosed in the embodiments are merely examples, and various modifications can be made in a scope without departing from the gist of the present disclosure. Appropriate modifications in a scope without departing from the gist of the present disclosure naturally belong to the technical scope of the present disclosure. At least one of various omission, replacement, and modification of the components can be performed in a scope without departing from the gist of the embodiments and modifications described above.

What is claimed is:

1. An input detection system comprising:
    a detection device including a plurality of sensor electrodes arrayed in a detection region;
    an input support device including an LC circuit, a first electrode coupled to one end side of the LC circuit, and a second electrode coupled to another end side of the LC circuit; and
    a control circuit including a drive signal supply circuit supplying a drive signal to the sensor electrodes and an adjustment circuit coupled to the sensor electrodes, wherein
    the adjustment circuit adjusts a circuit constant that is added to a capacitance between the sensor electrode and the first electrode or the second electrode facing the sensor electrode.

2. The input detection system according to claim 1, wherein
    a reference potential is coupled to the sensor electrode corresponding to one of the first electrode and the second electrode,
    a drive signal is supplied from the drive signal supply circuit to the sensor electrode corresponding to the other of the first electrode and the second electrode, and
    the adjustment circuit adjusts the circuit constant of at least one of between the sensor electrode and the reference potential and between the sensor electrode and the drive signal supply circuit.

3. The input detection system according to claim 1, further comprising:
    an arithmetic circuit configured to detect a frequency of external noise; and
    a detection frequency setting circuit configured to set a detection frequency as a frequency at which the sensor electrodes are driven based on the frequency of the noise, wherein
    the drive signal supply circuit sets a frequency of the drive signal in accordance with the detection frequency, and
    the adjustment circuit adjusts the circuit constant in accordance with the detection frequency.

4. The input detection system according to claim 1, wherein the adjustment circuit includes at least one or more capacitive element coupled to the sensor electrode and a switch element coupled in parallel with the capacitive element.

5. The input detection system according to claim 1, wherein the adjustment circuit includes at least one or more inductance element coupled to the sensor electrode and a switch element coupled in parallel with the inductance element.

6. The input detection system according to claim 1, wherein
    the sensor electrodes are arranged so as to face one of the first electrode and the second electrode, and
    the adjustment circuit includes a switch element coupled between the sensor electrodes and a reference potential.

7. The input detection system according to claim 4, wherein
    the drive signal supply circuit supplies the drive signal to the sensor electrodes in order,
    the adjustment circuit coupled to the sensor electrode as a drive target to which the drive signal is supplied turns on the switch element, and
    the adjustment circuit coupled to the sensor electrode as a non-drive target to which the drive signal is not supplied turns off the switch element.

8. The input detection system according to claim 4, comprising a display device with a detection function that includes a plurality of pixels and the sensor electrodes, wherein
    the control circuit executes a plurality of display periods for displaying an image and detection periods for detecting the input support device in a time division manner, and
    the adjustment circuit switches a coupling state of the switch element between the display periods and the detection periods.

9. The input detection system according to claim 8, wherein the adjustment circuit brings the switch element coupled to the sensor electrodes into coupled states in the display periods.

10. The input detection system according to claim 1, wherein
    the sensor electrodes include a plurality of drive electrodes to which the drive signal is supplied and a plurality of detection electrodes that output detection signals, and
    the adjustment circuit is coupled to the drive electrodes.

11. The input detection system according to claim 1, wherein the sensor electrodes are arrayed in a matrix with a row-column configuration in the detection region.

* * * * *